United States Patent
Goto

(10) Patent No.: US 9,177,716 B2
(45) Date of Patent: Nov. 3, 2015

(54) METHOD FOR DETECTING METAL FOREIGN OBJECT IN CONTACTLESS POWER SUPPLY SYSTEM, CONTACTLESS POWER SUPPLY DEVICE, POWER RECEPTION DEVICE, AND CONTACTLESS POWER SUPPLY SYSTEM

(71) Applicant: Panasonic Corporation, Osaka (JP)

(72) Inventor: Hiromichi Goto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 407 days.

(21) Appl. No.: 13/653,487

(22) Filed: Oct. 17, 2012

(65) Prior Publication Data
US 2013/0093257 A1 Apr. 18, 2013

(30) Foreign Application Priority Data
Aug. 25, 2011 (JP) ................................. 2011-183938

(51) Int. Cl.
| | |
|---|---|
| H01F 27/42 | (2006.01) |
| H01F 37/00 | (2006.01) |
| H01F 38/14 | (2006.01) |
| H02J 5/00 | (2006.01) |

(52) U.S. Cl.
CPC ................ *H01F 38/14* (2013.01); *H02J 5/005* (2013.01)

(58) Field of Classification Search
USPC .................................... 307/29, 104; 320/108
See application file for complete search history.

(56) References Cited

U.S. PATENT DOCUMENTS

| | | | |
|---|---|---|---|
| 7,893,564 B2 | 2/2011 | Bennett .......................... | 307/104 |
| 2009/0001932 A1 | 1/2009 | Kamijo et al. | |
| 2009/0278666 A1 | 11/2009 | Yoda et al. .................. | 340/10.34 |
| 2010/0270867 A1* | 10/2010 | Abe ............................... | 307/104 |
| 2012/0146580 A1* | 6/2012 | Kitamura ...................... | 320/108 |

(Continued)

FOREIGN PATENT DOCUMENTS

| | | |
|---|---|---|
| JP | 10-215530 A | 8/1998 |
| JP | 2009-011129 | 1/2009 |

(Continued)

OTHER PUBLICATIONS

Japanese Office Action for corresponding Japanese Application No. 2011-183938 dated Jan. 27, 2015.

(Continued)

*Primary Examiner* — Rexford Barnie
*Assistant Examiner* — Xuan Ly
(74) *Attorney, Agent, or Firm* — Renner, Otto, Boisselle & Sklar, LLP

(57) ABSTRACT

A contactless power supply system includes a power supply areas, each provided with a primary coil and a primary authentication coil. The primary coil and primary authentication coil are arranged at different locations. An electric appliance includes a power reception area provided with a secondary coil and a secondary authentication coil. The secondary coil and the secondary verification coil are arranged at different locations. The presence of a metal foreign object is detected between the primary coil and secondary coil based on a transmission oscillation signal generated by the primary coil, and the presence of a metal foreign object is detected between the primary authentication coil and secondary authentication coil based on an authentication oscillation signal generated by the primary authentication coil.

15 Claims, 15 Drawing Sheets

(56) References Cited

U.S. PATENT DOCUMENTS

2013/0015705 A1* 1/2013 Abe ................................ 307/29
2013/0099592 A1   4/2013 Abe .............................. 307/104

FOREIGN PATENT DOCUMENTS

| JP | 2011-072097 | A | 4/2011 |
| JP | 2011-211788 | A | 10/2011 |
| TW | 201208225 | | 2/2012 |
| WO | 2011/036863 | A1 | 3/2011 |
| WO | 2011/122348 | A1 | 10/2011 |

OTHER PUBLICATIONS

Taiwan Office Action for corresponding Application No. 101138657 dated May 5, 2014.
German Office Action for corresponding German Patent Application No. 102012020670.4 dated Jul. 30, 2014, with English language translation.
Korean Office Action for corresponding Korean Application No. 10-2012-0123595 dated Jan. 28, 2014.

* cited by examiner

Φ1

Φm1

Φ2

Φm2

METHOD FOR DETECTING METAL FOREIGN OBJECT IN CONTACTLESS POWER SUPPLY SYSTEM, CONTACTLESS POWER SUPPLY DEVICE, POWER RECEPTION DEVICE, AND CONTACTLESS POWER SUPPLY SYSTEM

TECHNICAL FIELD

The present invention relates to a method for detecting a metal foreign object in a contactless power supply system, a contactless power supply device, a power reception device, and a contactless power supply system.

BACKGROUND ART

An electromagnetic induction type contactless power supply system is provided with contactless power supply device, which includes a primary coil, and a power reception device, which includes a secondary coil. When an electric appliance including a power reception device is set on a setting surface of a contactless power supply device, the contactless power supply device excites a power supply coil. This excites a power reception coil, which is arranged in the power reception device of the electric appliance, through electromagnetic induction. The power reception coil generates secondary power that is converted into DC power and supplied to a load of the electric appliance.

When a metal foreign object is present between the contactless power supply device and electric appliance (power reception device), the metal foreign object may be heated by induction when power is being supplied. Hence, the contactless power supply systems may include a metal detection device that detects a metal foreign object. When the metal detection device detects a metal foreign object, the contactless power supply device stops supplying power.

A conventional contactless power supply system includes a primary authentication coil, which is arranged in a contactless power supply device, and a secondary authentication coil, which is arranged in a power reception device, to exchange authentication signals between the contactless power supply device and the power reception device. The contactless power supply system uses the primary and secondary authentication coils to detect a metal foreign object (for example, WO 2011/036863).

In the above publication, magnetic coupling occurs between the primary and secondary authentication coils when a metal foreign object is present between the contactless power supply device and the power reception device, and the contactless power supply system uses this effect to detect a metal foreign object. In detail, when a metal foreign object is present, an electromagnetic induction signal of the secondary authentication coils responding to the excitation of the primary authentication coils is decreased in amplitude. The electromagnetic induction signal of the secondary authentication coil is provided to the primary authentication coils as a load modulation signal. The contactless power supply device detects a metal foreign object from the amplitude of the provided load modulation signal.

SUMMARY OF THE INVENTION

In the technique of the above publication, however, when a small metal foreign object is located at a position separated from the centers of opposing primary and secondary authentication coils, magnetic coupling between the primary and secondary authentication coils is not reduced. Thus, high detection accuracy cannot be expected.

In the contactless power supply system of the above publication, two primary authentication coils are arranged at the inner side of the power supply coil, and two secondary authentication coils are arranged at the inner side of the power reception coil. Further, the central axis of each primary authentication coil is deviated from the central axis of the power supply coil. The central axis of each secondary authentication coil is deviated from the central axis of the power reception coil.

In this case, when a metal foreign object is located between the centers of opposed primary and secondary authentication coils, the metal foreign object can be accurately detected. However, the inventor of the present application has noticed that when a small metal foreign object is located between the centers of the power supply coil and the power reception coil that are opposed to each other, the magnetic coupling between the primary and secondary authentication coils does not decrease. Thus, the metal foreign object cannot be accurately detected.

It is an object of the present invention to provide a method for detecting a metal foreign object with improved detection accuracy in a contactless power supply system.

The present invention provides a contactless power supply device, a power reception device, and a contactless power supply system that are suitable for implementing this metal foreign object that improves the metal foreign object detection accuracy.

A first aspect of the present invention provides a method for detecting a metal foreign object in a contactless power supply system including a contactless power supply device and a power reception device. The contactless power supply device includes at least one power supply area and a primary coil and primary authentication coil, which correspond to the power supply area. The power reception device is arranged in an electric appliance, which includes at least one power reception area, and includes a secondary coil and a secondary authentication coil, which correspond to the power reception area. The method includes transmitting an authentication oscillating signal from the primary authentication coil; generating an authentication signal with the secondary authentication coil in response to the authentication oscillating signal; after the authentication signal is received by the primary authentication coil and authenticated, generating secondary power at the secondary coil with a power transmission oscillating signal generated by the primary coil; detecting whether or not a metal foreign object is present between the primary coil and the secondary coil based on the power transmission oscillating signal from the primary coil; and detecting whether or not a metal foreign object is present between the primary authentication coil and the secondary authentication coil based on the authentication oscillating signal from the primary authentication coil. The primary coil and the primary authentication coil are arranged in the power supply area at different locations. The secondary coil and the secondary authentication coil are arranged in the power reception area at different locations.

In one example, the detection of a metal foreign object between the primary coil and the secondary coil is performed before the detection of a metal foreign object between the primary authentication coil and the secondary authentication coil. When a metal foreign object is detected to be present between the primary coil and the secondary coil, the detection of a metal foreign object between the primary authentication coil and the secondary authentication coil is not performed.

In one example, the power transmission oscillating signal generated by the primary coil has a lower oscillation frequency than that of the authentication oscillating signal generated by the primary authentication coil.

In one example, the detection of a metal foreign object between the primary authentication coil and the secondary authentication coil is performed before the detection of a metal foreign object between the primary coil and the secondary coil. When a metal foreign object is detected to be present between the primary authentication coil and the secondary authentication coil, the detection of a metal foreign object between the primary coil and the secondary coil is not performed.

In one example, the authentication oscillating signal generated by the primary authentication coil has a lower oscillation frequency than that of the power transmission oscillating signal generated by the primary coil.

In one example, the primary coil is arranged in the middle of the power supply area. The primary authentication coil includes a first primary authentication coil and a second primary authentication coil that are connected in series to generate magnetic fluxes in opposite directions. The first primary authentication coil and the second primary authentication coil are arranged in the power supply area at symmetrical locations with the primary coil arranged in between. The secondary coil is arranged in the middle of the power reception area. The secondary authentication coil includes a first secondary authentication coil and a second secondary authentication coil that are connected in series to generate magnetic fluxes in opposite directions. The first secondary authentication coil and the second secondary authentication coil are arranged in the power reception area at symmetrical locations with the secondary coil arranged in between.

In one example, the primary authentication coil is arranged in the middle of the power supply area. The primary coil includes a first primary coil and a second primary coil that are connected in series to generate magnetic fluxes in opposite directions. The first primary coil and the second primary coil are arranged in the power supply area at symmetrical locations with the primary authentication coil arranged in between. The secondary authentication coil is arranged in the middle of the power reception area. The secondary coil includes a first secondary coil and a second secondary coil that are connected in series to generate magnetic fluxes in opposite directions. The first secondary coil and the second secondary coil are arranged in the power reception area at symmetrical locations with the secondary authentication coil arranged in between.

A second aspect of the present invention provides a contactless power supply device for use with a power reception device including a secondary coil, which generates secondary power in response to a power transmission oscillating signal, and a secondary authentication coil that generates an authentication signal in response to an authentication oscillating signal. The contactless power supply device includes at least one power supply area, a primary coil, which generates the power transmission oscillating signal, and a primary authentication coil, which generates the authentication oscillating signal. The primary coil and the primary authentication coil correspond to the power supply area. A center location of the primary coil and a center location of the primary authentication coil differ from each other in the power supply area. A first envelope detection circuit converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil. A second envelope detection circuit converts an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil. A system controller determines whether or not a metal foreign object is present in the power supply area based on the first load modulation signal, which is provided from the first envelope detection circuit, and the second load modulation signal, which is provided from the second envelope detection circuit.

In one example, the at least one power supply area is a plurality of power supply areas. The contactless power supply device further includes a plurality of excitation circuits corresponding to the plurality of power supply areas, respectively. A plurality of oscillation circuits correspond to the plurality of power supply areas, respectively. Each of the excitation circuits excites the primary coil in the corresponding power supply area to transmit the power transmission oscillating signal. Each of the oscillation circuits excites the primary authentication coil in the corresponding power supply area to transmit the authentication oscillating signal.

In one example, the primary coil is arranged in the middle of the power supply area. The primary authentication coil includes a first primary authentication coil and a second primary authentication coil that are connected in series to generate magnetic fluxes in opposite directions. The first primary authentication coil and the second primary authentication coil are arranged at symmetrical locations with the primary coil arranged in between.

In one example, the primary authentication coil is arranged in the middle of the power supply area. The primary coil includes a first primary coil and a second primary coil that are connected in series to generate magnetic fluxes in opposite directions. The first primary coil and the second primary coil are arranged at symmetrical locations with the primary authentication coil arranged in between.

In one example, the primary coil is arranged at a lower side of the primary authentication coil so that the primary authentication coil is proximal to the power reception device. The primary coil is wound around a core projecting upward from a magnetic body having a larger coil area than the primary coil.

A third aspect of the present invention is a power reception device for use with a contactless power supply device including a primary coil, which generates a power transmission oscillating signal, and a primary authentication coil, which generates an authentication oscillating signal. The power reception device is arranged in an electric appliance including at least one power reception area. The power reception device includes a secondary coil and a secondary authentication coil that correspond to the power reception area. The secondary authentication coil transmits an authentication signal to the primary authentication coil in response to the authentication oscillating signal generated by the primary authentication coil. The secondary coil generates secondary power with the power transmission oscillating signal from the primary coil. The secondary coil and the secondary authentication coil are arranged in the power reception area at different locations. A first modulation wave signal generation circuit generates a first modulation wave signal from the power transmission oscillating signal received by the secondary coil. The first modulation wave signal reflects a variation in a magnetic flux between the primary coil and the secondary coil. A first load modulation signal generation circuit generates a power transmission load modulation signal by modulating the power transmission oscillating signal with the first modulation wave signal. A second modulation wave signal generation circuit generates a second modulation wave signal from the authentication oscillating signal received by the secondary authentication coil. The second modulation wave signal reflects a variation in a magnetic flux between the primary authentication coil and the secondary authentication coil. A second load modulation signal generation circuit generates an authentication load modulation signal by modulating the authentication oscillating signal with the second modulation wave signal.

In one example, the secondary coil is arranged in the middle of the power reception area. The secondary authentication coil includes a first secondary authentication coil and a second secondary authentication coil that are connected in series to generate magnetic fluxes in opposite directions. The first secondary authentication coil and the second secondary authentication coil are arranged at symmetrical locations with the secondary coil arranged in between.

In one example, the secondary authentication coil is arranged in the middle of the power reception area. The secondary coil includes a first secondary coil and a second secondary coil that are arranged in series to generate magnetic fluxes in opposite directions. The first secondary coil and the second secondary coil are arranged at symmetrical locations with the secondary authentication coil arranged in between.

In one example, the secondary coil is arranged at an upper side of the secondary authentication coil so that the secondary authentication coil is proximal to the contactless power supply device. The secondary coil is wound around a core projecting downward from a magnetic body having a larger coil area than the secondary coil.

A fourth aspect of the present invention is a contactless power supply system provided with an electric appliance, which includes at least one power reception area and a power reception device, and a contactless power supply device. The contactless power supply device includes at least one power supply area, a primary coil, which corresponds to the power supply area and generates a power transmission oscillating signal, and a primary authentication coil, which corresponds to the power supply area and generates an authentication oscillating signal. The power reception device includes a secondary coil, which corresponds to the power reception area and generates secondary power in response to the power transmission oscillating signal, and a secondary authentication coil, which corresponds to the power reception area and generates an authentication signal in response to the authentication oscillating signal. The primary coil and the primary authentication coil are arranged in the power supply area at different locations. The secondary coil and the secondary authentication coil are arranged in the power reception area at different locations. The contactless power supply device includes a first envelope detection circuit that converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil. A second envelope detection circuit converts an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil. A system controller determines whether or not a metal foreign object is present in the power supply area based on the first load modulation signal provided from the first envelope detection circuit and the second load modulation signal provided from the second envelope detection circuit. The power reception device includes a first modulation wave signal generation circuit that generates a first modulation wave signal from the power transmission oscillating signal received by the secondary coil. The first modulation wave signal reflects a variation in a magnetic flux between the primary coil and the secondary coil. A first load modulation signal generation circuit generates the power transmission load modulation signal by modulating the power transmission oscillating signal with the first modulation wave signal. A second modulation wave signal generation circuit generates a second modulation wave signal from the authentication oscillating signal received by the secondary authentication coil. A second load modulation signal generation circuit generates the authentication load modulation signal by modulating the authentication oscillating signal with the second modulation wave signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

EMBODIMENTS OF THE INVENTION

First Embodiment

A first embodiment of a contactless power supply system according to the present invention will now be described with reference to the drawings.

Figure 1:
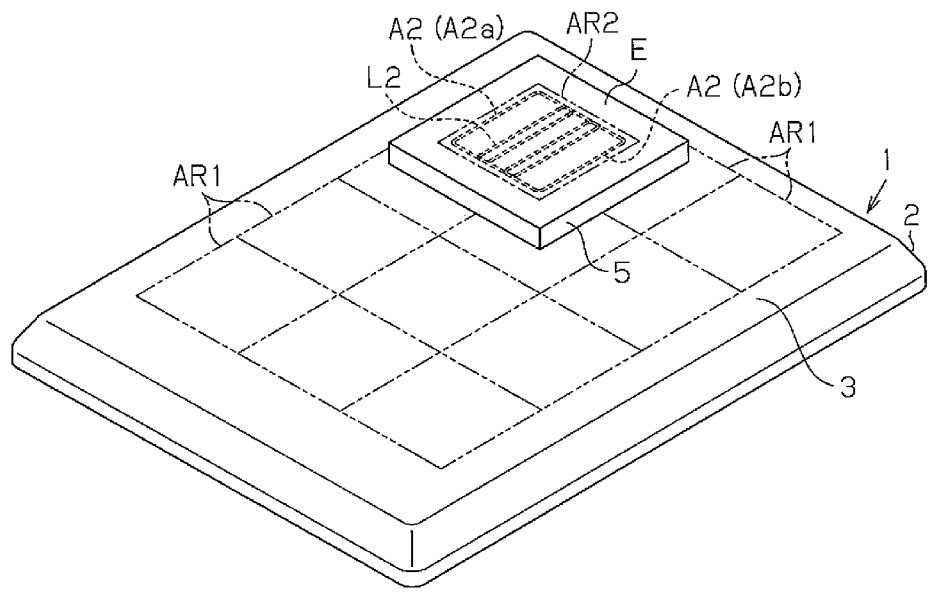
FIG. 1 is a perspective view illustrating a contactless power supply system according to a first embodiment of the present invention.

As illustrated in FIG. 1, the contactless power supply system includes a contactless power supply device (hereinafter simply referred to as the power supply device) 1 and an electric appliance E, which is supplied with power in a contactless manner from the power supply device 1.

The power supply device 1 includes a tetragonal plate-shaped casing 2. The casing 2 includes a flat upper surface that forms a setting surface 3 on which the electric appliance E is set. A plurality of tetragonal power supply areas AR1 are formed on the setting surface 3. In the first embodiment, the power supply areas AR1 are arranged on the setting surface 3 in a three by four matrix.

Figure 2:
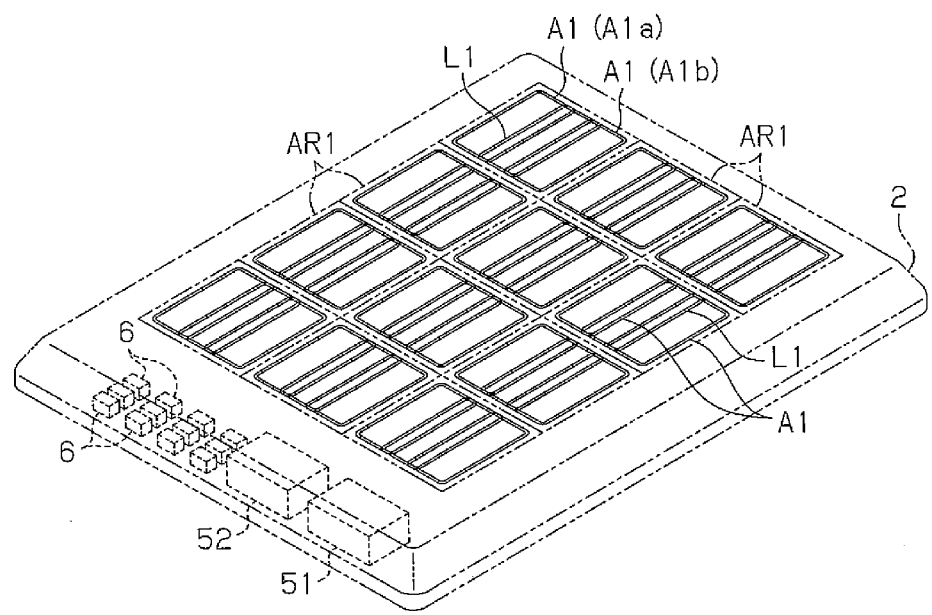
FIG. 2 is a schematic view illustrating primary coils and primary authentication coils arranged in the contactless power supply device.

As illustrated in FIG. 2, a plurality of primary coils L1 are respectively arranged in the casing 2 at locations corresponding to the power supply areas AR1 to fit into the power supply areas AR1.

Figure 3A:
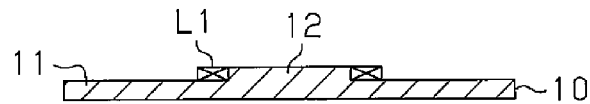
FIG. 3A is a cross-sectional view of the primary coil wound around a magnetic body.
Figure 3B:
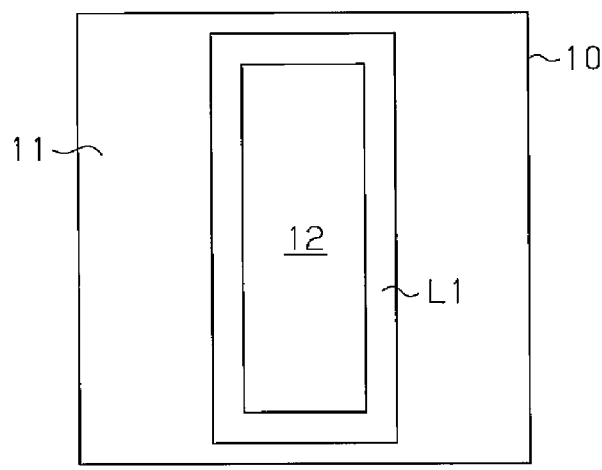
FIG. 3B is a plan view of the primary coil wound around the magnetic body.

As illustrated in FIGS. 3A and 3B, the primary coil L1 includes a wire wound around a magnetic body 10 made of ferrite. The magnetic body 10 is formed to have a tetragonal plate shape in conformance with the contour of the power supply area AR1. The magnetic body 10 includes a core 12 and a rim 11 surrounding the core 12. The core 12 is a projection extending upward. The core 12 is rectangular in shape as viewed from above, but may be square in shape instead.

The primary coil L1 is wound around the core 12 of the magnetic body 10. The magnetic bodies 10, which have the primary coils L1 wound around the cores 12, are arranged in the casing 2 at a locations corresponding to the power supply areas AR1.

Figure 4A:
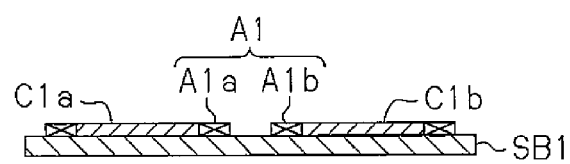
FIG. 4A is a cross-sectional view of the primary authentication coil fixed to a resin substrate.
Figure 4B:
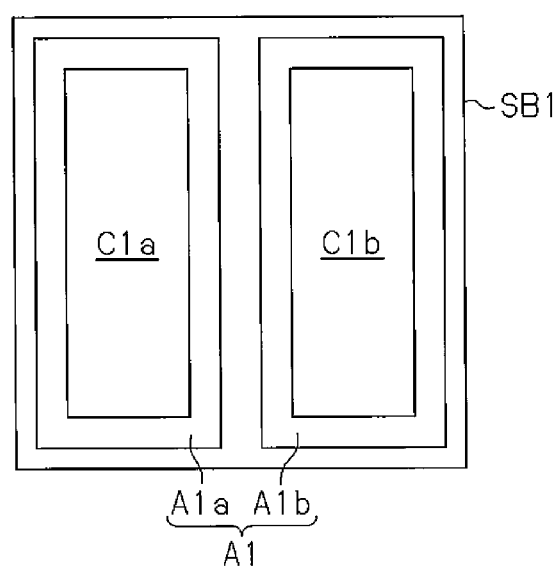
FIG. 4B is a plan view of the primary authentication coil fixed to the resin substrate.
Figure 5:
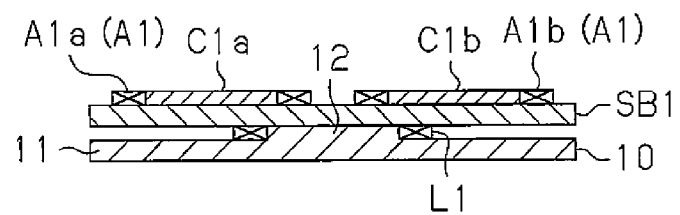
FIG. 5 is a cross-sectional view of the primary coil and the primary authentication coil arranged in each power supply area of the contactless power supply device.

As illustrated in FIG. 5, a primary authentication coil A1 is arranged above the magnetic body 10. As illustrated in FIGS. 4A and 4B, the primary authentication coil A1 includes a first primary authentication coil A1a and a second primary authentication coil A1b, which are fixed by an adhesive to a resin substrate SB1 made of a non-magnetic resin.

The first primary authentication coil A1a and the second primary authentication coil A1b are wound around a first primary core C1a and a second primary core C1b, respectively. Each of the first primary core C1a and the second primary core C1b is made of a non-magnetic resin. The first primary coil A1a and the second primary coil A1b are arranged in each power supply area AR1. In the first embodiment, the first primary coil A1a and the second primary coil A1b are not overlapped with each other as viewed from above. Preferably, the first primary coil A1a is arranged in the left half region of the power supply area AR1 and the second primary coil A1b is arranged in the right half region to be separated away from each other in the horizontal direction.

As illustrated in FIG. 5, the resin substrate SB1 is fixed to the upper side of the corresponding magnetic body 10. The primary coil L1 is arranged in the middle portion of the corresponding power supply area AR1. The first primary authentication coil A1a and the second primary authentication coil A1b are arranged at symmetrical locations sandwiching the middle portion of the power supply area AR1.

The first primary authentication coil A1a and the second primary authentication coil A1b are connected in series to each other and are wound to generate magnetic fluxes in opposite directions.

The casing 2 accommodates, on a circuit board at locations excluding the power supply areas AR1, basic power supply unit circuits 6 for each power supply area AR1, or primary coil L1 (primary authentication coil A1), a system controller 52 that centrally control the basic power supply unit circuits 6, and a power circuit 51 that supplies drive power to the basic power supply unit circuits 6 and the system controller 52. The basic power supply unit circuits 6 supply power in a contactless manner to the electric appliance E that is set on one of the power supply areas AR1 and excites a corresponding one of the primary coils L1 alone or in cooperation with another primary coil L1.

The basic power supply unit circuits 6 excite the corresponding primary authentication coils A1 and conduct wireless communication with the electric appliance E set on the setting surface 3 to exchange various types of data, including authentication data and detect a metal foreign object set on a power supply area AR1.

As illustrated in FIG. 1, the electric appliance E includes a casing 5 having a lower surface that forms a power reception area AR2. The casing 5 accommodates a secondary coil L2. The secondary coil L2 is formed to have the same shape as the primary coil L1 in each power supply area AR1.

Figure 6A:
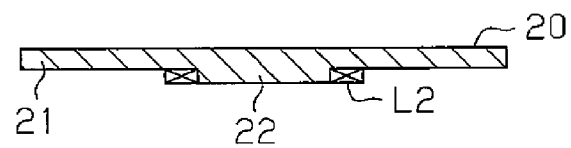
FIG. 6A is a cross-sectional view of the secondary coil wound around a magnetic body.
Figure 6B:
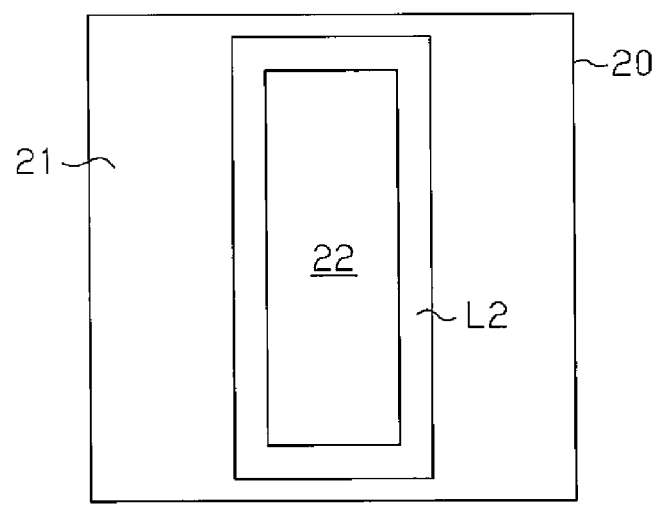
FIG. 6B is a bottom view of the secondary coil wound around the magnetic body.

As illustrated in FIGS. 6A and 6B, the secondary coil L2 is wound around a magnetic body 20 made of ferrite. In the first embodiment, the magnetic body 20 is formed to have a tetragonal plate shape in conformance with the contour of the power reception area AR2. The magnetic body 20 includes a core 22 and a rim 21 surrounding the core 22. The core 22 is a projection extending downward. The core 22 is rectangular in shape as viewed from below, but may be square in shape instead. The secondary coil L2 is arranged in the casing 5 of the electric appliance E together with the magnetic body 20.

Figure 7A:
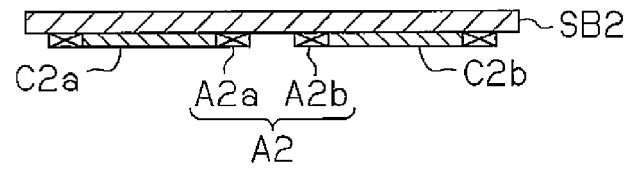
FIG. 7A is a cross-sectional view of the secondary authentication coil fixed to a resin substrate.
Figure 7B:
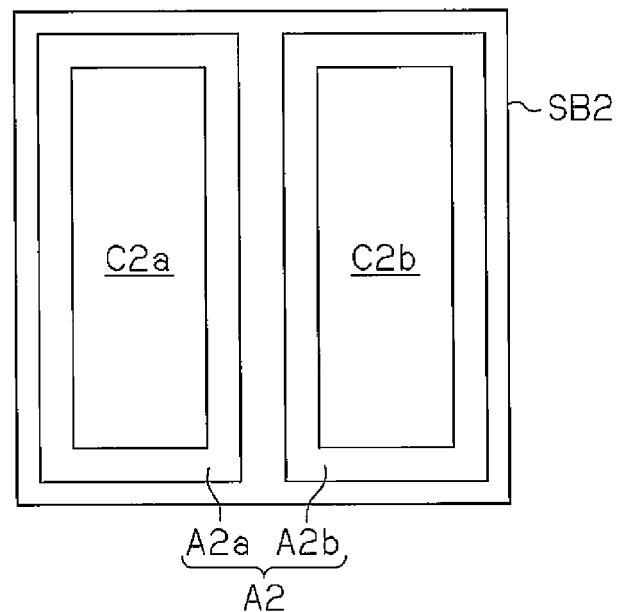
FIG. 7B is a bottom view of the secondary authentication coil fixed to the resin substrate.
Figure 8:
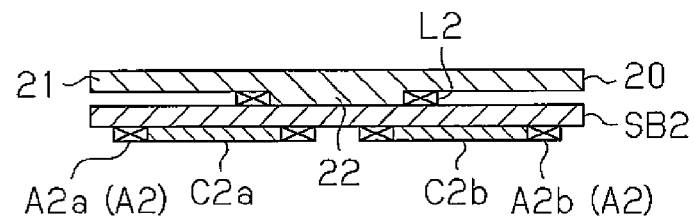
FIG. 8 is a cross-sectional view of the secondary coil and secondary authentication coil arranged in an electric appliance.

As illustrated in FIG. 8, a secondary authentication coil A2 is arranged at the lower side of the magnetic body 20. As illustrated in FIGS. 7A and 7B, the secondary authentication coil A2 includes a first secondary authentication coil A2a and a second secondary authentication coil A2b, which are fixed to a resin substrate SB2 made of a non-magnetic resin.

The first secondary authentication coil A2a and the second secondary authentication coil A2b are wound around a first secondary core C2a and a second secondary core C2b, respectively. The first secondary core C2a and the second secondary core C2b are made of a non-magnetic resin. The first secondary authentication coil A2a and the second secondary authentication coil A2b are fixed by an adhesive to the resin substrate SB2. In the first embodiment, the first secondary authentication coil A2a and the second secondary authentication coil A2b are arranged so as not to overlap each other, as viewed from below. Preferably, the first secondary authentication coil A2a is arranged in the left half region of the power reception area AR2 and the second secondary authentication coil A2b is arranged in the right half region to be separated away from each other in the horizontal direction.

As illustrated in FIG. 8, when the resin substrate SB2 is fixed to the lower side of the magnetic body 20, the secondary coil L2 is arranged in the middle portion of the power reception area AR2. The first secondary authentication coil A2a and the second secondary authentication coil A2b are arranged at symmetrical locations sandwiching the middle portion of the power reception area AR2.

The first secondary authentication coil A2a and the second secondary authentication coil A2b are connected in series and wound to generate magnetic fluxes in opposite directions.

In the illustrated example, the secondary coil L2 has the same shape as the primary coil L1. In addition, the first secondary authentication coil A2a has the same shape as the first primary authentication coil A1a in each power supply area AR1 of the power supply device 1, and the second secondary authentication coil A2b has the same shape as the second primary authentication coil A1b in each power supply area AR1.

Figure 9A:
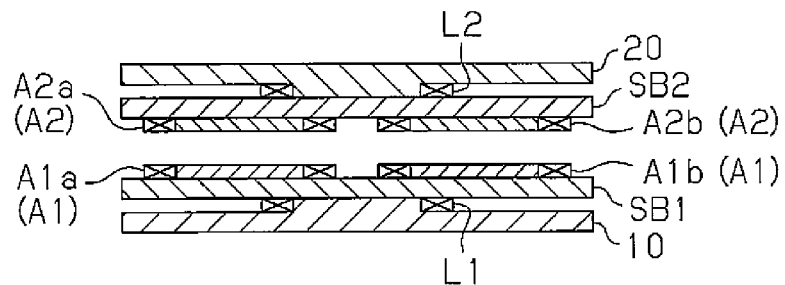
FIG. 9A is a cross-sectional view illustrating a state in which the primary coil and the primary authentication coil in the power supply device are opposing the secondary coil and the secondary authentication coil in the electric appliance.

As illustrated in FIG. 9A, when the power reception area AR2 of the electric appliance E is opposed to a power supply areas AR1 of the power supply device 1, the center, or core 12, of the primary coil L1 is aligned with the center, or core 22, of the secondary coil L2. In addition, the first core C1a of the first primary authentication coil A1a is aligned with the first core C2a of the first secondary authentication coil A2a. Likewise, the second core C1b of the second primary authentication coil A1b is aligned with the second core C2b of the second secondary authentication coil A2b.

Figure 9B:
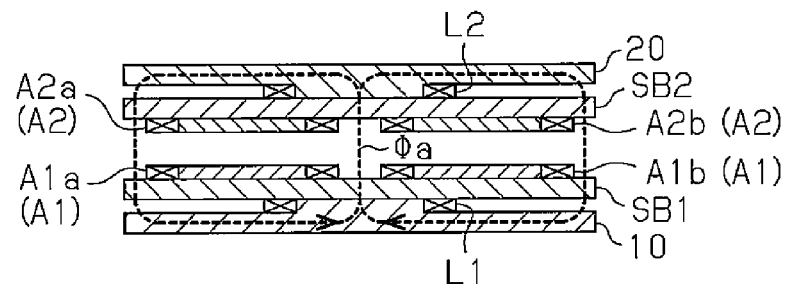
FIG. 9B is a schematic view illustrating a magnetic circuit generated by the excitation of the primary coil.
Figure 9C:
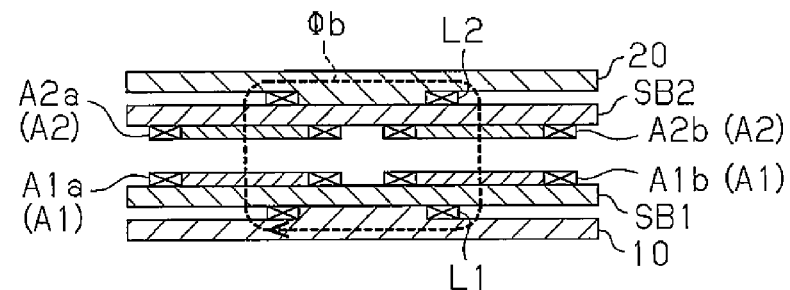
FIG. 9C is a schematic view illustrating a magnetic circuit generated by the excitation of the primary authentication coil.

When the primary coil L1 is excited with the power reception area AR2 and the power supply area AR1 opposed to each other, a magnetic circuit $\Phi a$ is formed, as illustrated in FIG. 9B. Further, when the primary authentication coil A1 is excited with the power reception area AR2 and the power supply area AR1 opposing each other, a magnetic circuit $\Phi b$ is formed, as illustrated in FIG. 9C.

Figure 10:
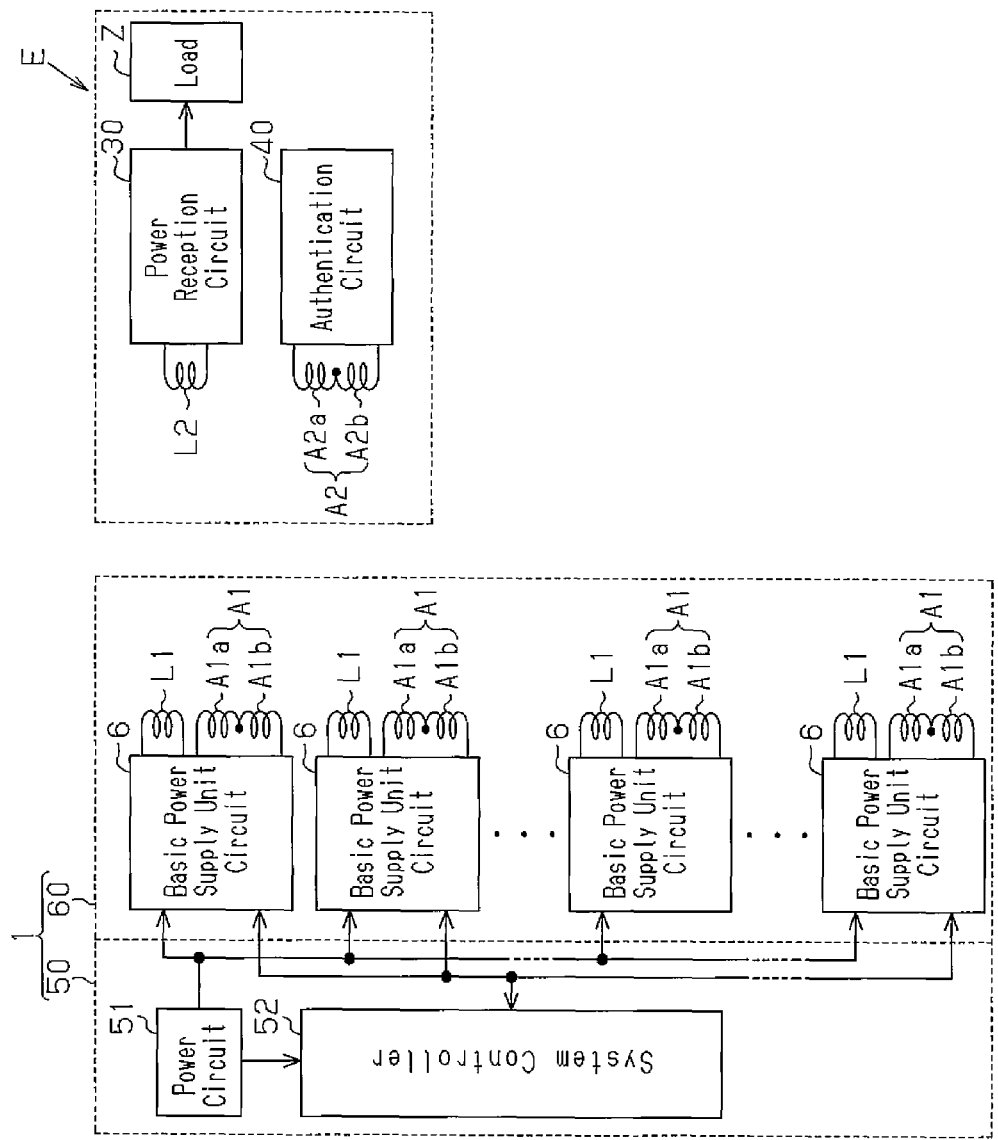
FIG. 10 is a block diagram of the power supply device and the electric appliance.

Electric circuits and the control of the power supply device 1 and the electric appliance E will now be described with reference to FIG. 10.

The electric appliance E includes the power reception device and a load Z. In the example of FIG. 10, the power reception device includes a power reception circuit 30, an authentication circuit 40, the secondary coil L2, and the secondary authentication coil A2. The power reception circuit 30 is connected to the secondary coil L2. When receiving a power transmission oscillating signal $\Phi 1$ (see FIG. 14A) from the power supply device 1, the secondary coil L2 generates secondary power through electromagnetic induction. The authentication circuit 40 is connected to the secondary authentication coil A2. The authentication circuit 40 receives an authentication oscillating signal $\Phi 2$ (see FIG. 15A) from the power supply device 1 through the secondary authentication coil A2.

Figure 11:
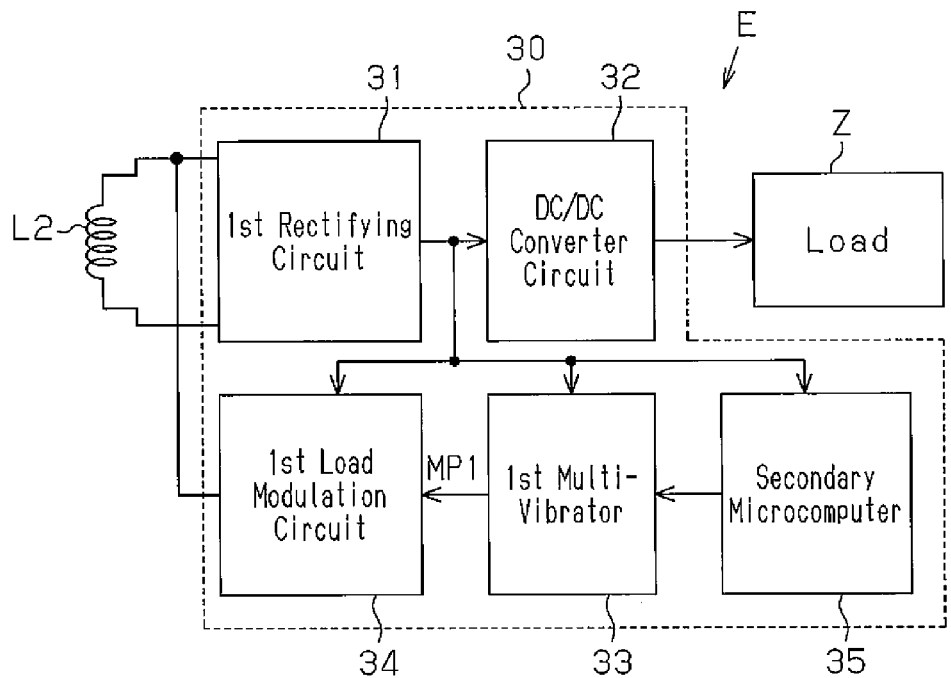
FIG. 11 is a block diagram of a power reception circuit arranged in the electric appliance of FIG. 10.

As illustrated in FIG. 11, the power reception circuit 30 includes a first rectifying circuit 31, a DC/DC converter circuit 32, a first multi-vibrator 33, a first load modulation circuit 34, and a secondary microcomputer 35.

Figure 14A:
FIG. 14A is a waveform diagram of a power transmission oscillating signal.

The first rectifying circuit 31 is connected to the secondary coil L2. The first rectifying circuit 31 converts the secondary power at the secondary coil L2 into a ripple-free DC voltage. The power transmission oscillating signal $\Phi 1$ is a sinusoidal wave having a fixed amplitude and a fixed frequency, as illustrated in FIG. 14A.

The DC/DC converter circuit 32 DC/DC-converts the DC voltage generated by the first rectifying circuit 31 into a desired voltage and applies the DC/DC-converted voltage to the load Z of the electric appliance E. The load Z only needs to be a device driven by the secondary power of the secondary coil L2. For example, the load Z may be a device set on the setting surface 3 and driven by DC power that is DC/DC-converted power or driven directly by the secondary power as AC power. Alternatively, the load Z may be a device that charges a built-in chargeable battery (secondary battery) with the DC/DC-converted power.

The DC voltage generated by the first rectifying circuit 31 is supplied as drive power to the first multi-vibrator 33 and the secondary microcomputer 35. The first multi-vibrator 33 may be formed by a known astable multi-vibrator. The first multi-vibrator 33 performs a vibration operation in accordance with a control signal from the secondary microcomputer 35 and provides a first ON/OFF signal MP1 to the first load modulation circuit 34.

As illustrated in FIG. 11, an output terminal of the first load modulation circuit 34 is connected to an end of the secondary coil L2. When activation of the first ON/OFF signal MP1 is instructed, the first load modulation circuit 34 connects the end of the secondary coil L2 to ground through a resistor (not illustrated) arranged in the first load modulation circuit 34. When deactivation of the first ON/OFF signal MP1 is instructed, the first load modulation circuit 34 disconnects the end of the secondary coil L2 from ground.

Accordingly, when the end of the secondary coil L2 is connected to ground through the resistor of the first load modulation circuit 34, some of the current flowing to the first rectifying circuit 31 flows to ground. When the end of the secondary coil L2 is disconnected from ground by the first load modulation circuit 34, all of the current from the secondary coil L2 flows to the first rectifying circuit 31.

As a result, the secondary current that flows across the two terminals of the secondary coil L2 based on the power transmission oscillating signal Φ1 is changed in accordance with the first ON/OFF signal MP1. The change in the secondary current varies the magnetic flux generated by the secondary coil L2. The varied magnetic flux changes a primary current at the primary coil L1 due to electromagnetic induction.

Figure 14B:
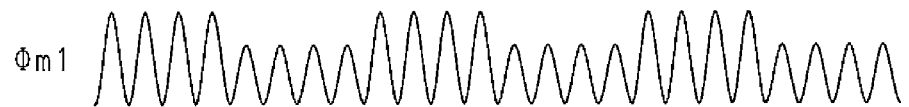
FIG. 14B is a waveform diagram of a power transmission load modulation signal.

In detail, the current that flows across the two terminals of the secondary coil L2 in accordance with the first ON/OFF signal MP1 (the current based on the power transmission oscillating signal Φ1) is amplitude-modulated (load-modulated) into a power transmission load modulation signal Φm1 as illustrated in FIG. 14B. The power transmission load modulation signal φm1 is transmitted from the secondary coil L2 to the primary coil L1.

In other words, the power transmission oscillating signal Φ1 received by the secondary coil L2 functions as a carrier signal. The first load modulation circuit 34 modulates the amplitude of the carrier signal (power transmission oscillating signal Φ1) in accordance with the first ON/OFF signal MP1 to generate the power transmission load modulation signal Φm1 illustrated in FIG. 14B.

Figure 12:
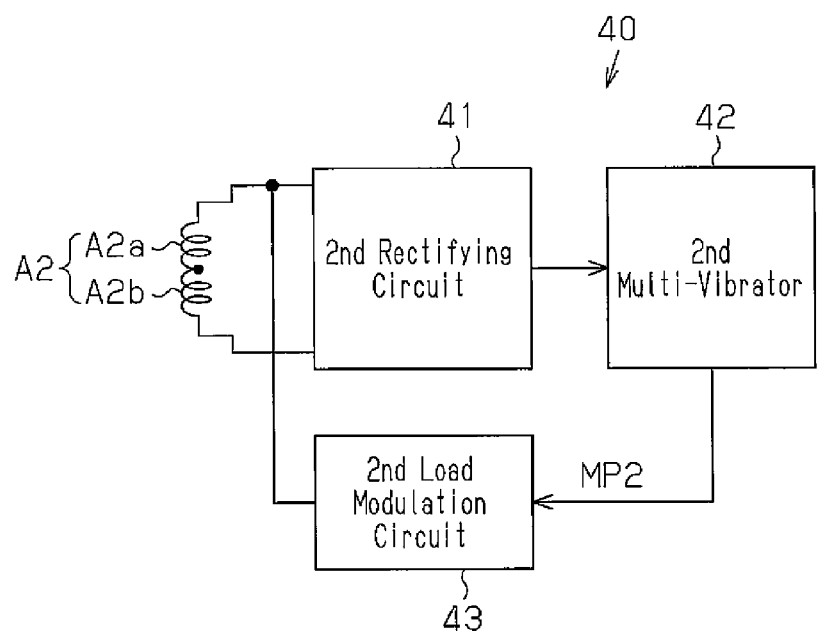
FIG. 12 is a block diagram of an authentication circuit arranged in the electric appliance of FIG. 10.

As illustrated in FIG. 12, the authentication circuit 40 includes a second rectifying circuit 41, a second multi-vibrator 42, and a second load modulation circuit 43.

Figure 15A:
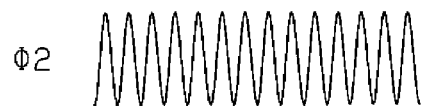
FIG. 15A is a waveform diagram of an authentication oscillating signal.

The second rectifying circuit 41 is connected to the secondary authentication coil A2. When receiving the authentication oscillating signal Φ2 from the primary authentication coil A1 of the power supply device 1, the secondary authentication coil A2 generates the secondary power through electromagnetic induction. The second rectifying circuit 41 converts the secondary power at the secondary authentication coil A2 into ripple-free DC voltage. The authentication oscillating signal Φ2 is a sinusoidal wave having a fixed amplitude and a fixed frequency, as illustrated in FIG. 15A.

The second multi-vibrator 42 may be formed by a known astable multi-vibrator to which the DC voltage generated by the second rectifying circuit 41 is applied as drive power. When the DC voltage is applied to the second multi-vibrator 42 by the second rectifying circuit 41, the second multi-vibrator 42 performs a vibration operation to provide a second ON/OFF signal MP2 to the second load modulation circuit 43.

As illustrated in FIG. 12, an output terminal of the second load modulation circuit 43 is connected to an end of the secondary authentication coil A2. When activation of the second ON/OFF signal MP2 is instructed, the second load modulation circuit 43 connects the end of the secondary authentication coil A2 to ground through a resistor (not illustrated) arranged in the second load modulation circuit 43. When deactivation of the second ON/OFF signal MP2 is instructed, the second load modulation circuit 43 disconnects the end of the secondary authentication coil A2 from ground.

Accordingly, when the end of the secondary authentication coil A2 is connected to ground through the resistor of the second load modulation circuit 43, some of the current flowing to the second rectifying circuit 41 flows to ground. When the end of the secondary authentication coil A2 is disconnected from ground by the second load modulation circuit 43, all of the current from the secondary authentication coil A2 flows to the second rectifying circuit 41.

As a result, the secondary current that flows across the two terminals of the secondary authentication coil A2 based on the authentication oscillating signal Φ2 is changed in accordance with the second ON/OFF signal MP2. The change in the secondary current varies the magnetic flux generated by the secondary authentication coil A2. The variation in the magnetic flux changes the primary current at the primary coil L1 through electromagnetic induction.

Figure 15B:
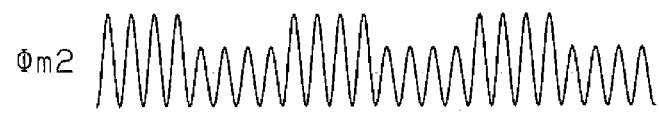
FIG. 15B is a waveform diagram of an authentication load modulation signal.

In more detail, the current that flows across the two terminals of the secondary authentication coil A2 in accordance with the second ON/OFF signal MP2 (the current based on the authentication oscillating signal Φ2) is subjected to an amplitude (load) modulation into an authentication load modulation signal Φm2 as illustrated in FIG. 15B. The authentication load modulation signal Φm2 is transmitted from the secondary authentication coil A2 to the primary authentication coil A1.

In other words, the authentication oscillating signal Φ2 received by the secondary authentication coil A2 functions as a carrier signal. The second load modulation circuit 43 modulates the amplitude of this carrier signal (authentication oscillating signal Φ2) in accordance with the second ON/OFF signal MP2 to generate the authentication load modulation signal Φm2 as illustrated in FIG. 15B.

The power supply device 1 will now be described. As illustrated in FIG. 10, the power supply device 1 includes a common unit 50 and a basic unit 60.

The common unit 50 includes the power circuit 51 and the system controller 52 that centrally controls the basic unit 60. The power circuit 51 includes a rectifying circuit and a DC/DC convertor and rectifies externally supplied commercial power with the rectifying circuit. The power circuit 51 converts the rectified DC voltage into a desired voltage with the DC/DC convertor and then applies the DC voltage as drive power to the system controller 52 and the basic unit 60. The system controller 52 is formed by a microcomputer and centrally controls the basic unit 60.

The basic unit 60 includes the basic power supply unit circuits 6 provided for the power supply areas AR1 (primary coils L1), respectively. Each basic power supply unit circuit 6 exchanges data with the system controller 52 and is controlled by the system controller 52.

Each basic power supply unit circuit 6 has the same circuit configuration. Thus, for the sake of brevity, only one of the basic power supply unit circuits 6 with reference to FIG. 13.

Figure 13:
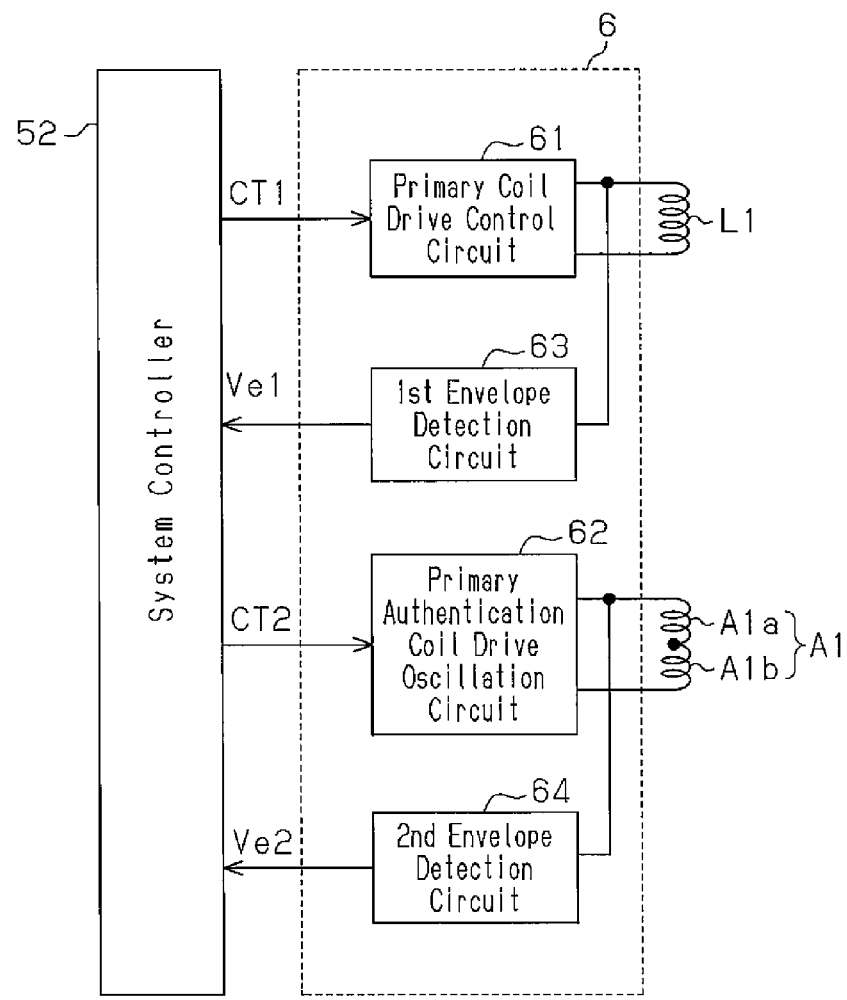
FIG. 13 is a block diagram of a basic power supply unit circuit arranged in the power supply device of FIG. 10.

As illustrated in FIG. 13, the basic power supply unit circuit 6 includes a primary coil drive control circuit 61, a primary authentication coil drive oscillation circuit 62, a first envelope detection circuit 63, and a second envelope detection circuit 64.

The primary coil drive control circuit 61 is connected to the primary coil L1. The primary coil drive control circuit 61, which receives a first excitation control signal CT1 from the system controller 52, drives and excites the primary coil L1 based on the first excitation control signal CT1.

In the first embodiment, the primary coil drive control circuit 61 includes a full-bridge circuit. The primary coil drive control circuit 61 drives and excites the primary coil L1 at a predetermined frequency (e.g., 140 kHz) based on the first excitation control signal CT1 from the system controller 52 so that the primary coil L1 generates a power transmission oscillating signal $\Phi 1$.

The primary authentication coil drive oscillation circuit 62 is connected to the primary authentication coil A1. The primary authentication coil drive oscillation circuit 62 receives a second excitation control signal CT2 from the system controller 52 and drives and excites the primary authentication coil A1 based on the second excitation control signal CT2.

In the first embodiment, the primary authentication coil drive oscillation circuit 62 includes a Colpitts oscillation circuit. The primary authentication coil drive oscillation circuit 62 drives and excites the primary authentication coil A1 at a predetermined frequency (e.g., 2 MHz to 3 MHz) based on the second excitation control signal CT2 from the system controller 52 so that the primary authentication coil A1 generates an authentication oscillating signal $\Phi 2$. Specifically, the primary authentication coil drive oscillation circuit 62 transmits the authentication oscillating signal $\Phi 2$ having a frequency higher than that of the power transmission oscillating signal $\Phi 1$ from the primary authentication coil A1.

The first envelope detection circuit 63 is connected to the primary coil L1. The first envelope detection circuit 63 detects current flowing to the primary coil L1 and converts the detected current into a first voltage signal Vx1 (see FIGS. 16A, 16B and 16C). The first envelope detection circuit 63 detects an envelope of the first voltage signal Vx1, generates a first load modulation signal Ve1, and provides the first load modulation signal Ve1 to the system controller 52.

When no object is set on the setting surface 3 (power supply areas AR1), the power supply device 1 (primary coil L1) and the electric appliance E (secondary coil L2) are not magnetically coupled. Since the primary coil L1 is not affected by the magnetic flux from the electric appliance E (secondary coil L2), the primary coil L1 transmits the power transmission oscillating signal $\Phi 1$ as illustrated in FIG. 14A.

Figure 16A:
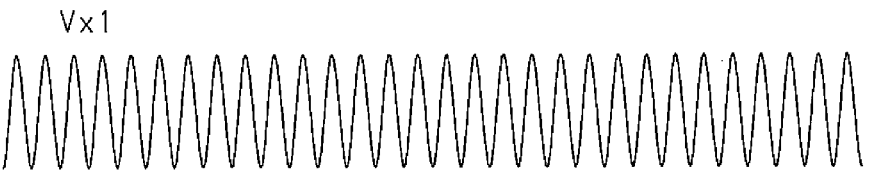
FIG. 16A is a waveform diagram of a voltage that a first envelope detection circuit acquires from the primary coil when no object is present.

Here, the first voltage signal Vx1 that the first envelope detection circuit 63 acquires is a sinusoidal wave as illustrated in FIG. 16A corresponding to the waveform of the power transmission oscillating signal $\Phi 1$. When no object is set on the setting surface 3 (power supply areas AR1), the amplitude of the first voltage signal Vx1 becomes the maximum.

When the electric appliance E (and/or a metal piece M) is set on the setting surface 3, the primary coil L1 and the secondary coil L2 (and/or the primary coil L1 and the metal piece M) are magnetically coupled. The impedance with respect to the primary coil L1 is increased in accordance with the magnetic coupling.

Here, the primary coil L1 receives the power transmission load modulation signal $\Phi m1$ (see FIG. 14B) from the secondary coil L2. This changes the first voltage signal Vx1, which the first envelope detection circuit 63 acquires, to a waveform illustrated in FIG. 16B or 16C corresponding to the power transmission load modulation signal $\Phi m1$.

Figure 16B:
FIG. 16B is a waveform diagram of a voltage that the first envelope detection circuit acquires from the primary coil when a metal piece is not present.

For example, when a metal piece M is not present between the primary coil L1 and the secondary coil L2, the waveform of the first voltage signal Vx1 is changed to the waveform illustrated in FIG. 16B. When a metal piece M is present between the primary coil L1 and the secondary coil L2, the first voltage signal Vx1 changes to the waveform illustrated in FIG. 16C.

Figure 16C:
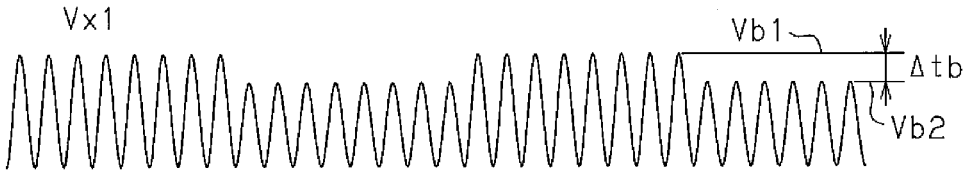
FIG. 16C is a waveform diagram of a voltage that the first envelope detection circuit acquires from the primary coil when a metal piece is present.

The first voltage signals Vx1 of FIGS. 16B and 16C each have a period (high level period), during which a relatively large amplitude continues in correspondence with the waveform of the power transmission load modulation signal $\Phi m1$ from the secondary coil L2, and a period (low level period), during which a relatively small amplitude continues.

For example, the first voltage signal Vx1 of FIG. 16B, has a difference $\Delta ta$ between the amplitude value Va1 in the high level period and the amplitude value Va2 in the low level period. The first voltage signal Vx1 of FIG. 16C has a difference $\Delta tb$ between the amplitude value Vb1 in the high level period and the amplitude value Vb2 in the low level period. The difference $\Delta ta$ is greater than the difference $\Delta tb$. Thus, the difference between the respective amplitudes in the high and low level periods of the first voltage signal Vx1 is smaller when a metal piece M is present between the primary coil L1 and the secondary coil L2 than when the metal piece M is not present ($\Delta tb < \Delta ta$).

This is because the presence of the metal piece M between the primary coil L1 and the secondary coil L2 weakens the magnetic coupling of the primary coil L1 and the secondary coil L2. Thus, the primary coil L1 is less affected by the impedance of the electric appliance E, and the amplitude in the low level period, during which the primary coil L1 is greatly affected by the impedance of the electric appliance E, is changed by a greater amount than the amplitude in the high level period, during which the primary coil L1 is not affected much by the impedance of the electric appliance E.

The first envelope detection circuit 63 detects an envelope of the first voltage signal Vx1 corresponding to the current flowing to the primary coil L1, converts the first voltage signal Vx1 into the first load modulation signal Ve1, and provides the signal Ve1 to the system controller 52.

The second envelope detection circuit 64 is connected to the primary authentication coil A1. The second envelope detection circuit 64 detects a current flowing to the primary authentication coil A1 and converts the detected current into a second voltage signal Vx2 (see FIG. 17). The second envelope detection circuit 64 detects an envelope of the second voltage signal Vx2, converts the second voltage signal Vx2 into a second load modulation signal Ve2, and provides the signal Vx2 to the system controller 52.

When no object is set on the setting surface 3 (power supply areas AR1), the primary authentication coil A1 is not affected by the magnetic flux from the electric appliance E (secondary coil L2). Thus, the primary authentication coil A1 transmits the authentication oscillating signal $\Phi 2$ illustrated in FIG. 15A.

Figure 17A:
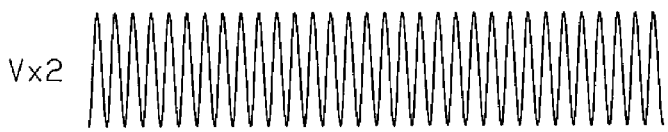
FIG. 17A is a waveform diagram of a voltage that a second envelope detection circuit acquires from the primary authentication coil when no object is present.

Here, the second voltage signal Vx2, which the second envelope detection circuit 64 acquires, is a sinusoidal wave as illustrated in FIG. 17A corresponding to the waveform of the authentication oscillating signal $\Phi 2$. When no object is set on the setting surface 3 (power supply areas AR1), the amplitude of the second voltage signal Vx2 becomes the maximum.

When the electric appliance E (and/or the metal piece M) is set on the setting surface 3, the primary authentication coil A1 and the secondary authentication coil A2 (and/or the primary authentication coil A1 and the metal piece M) are magnetically coupled. The impedance with respect to the primary authentication coil A1 is increased in accordance with the magnetic coupling.

Here, the primary authentication coil A1 receives the authentication load modulation signal $\Phi m2$ (see FIG. 15B) from the secondary authentication coil A2. Thus, the second voltage signal Vx2, which the second envelope detection circuit 64 acquires, is changed to a waveform illustrated in FIG. 17B or 17C corresponding to the authentication load modulation signal Φm2.

Figure 17B:
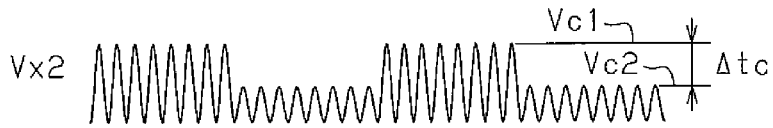
FIG. 17B is a waveform diagram of a voltage that the second envelope detection circuit acquires from the primary authentication coil when a metal piece is not present.

For example, when a metal piece M is not present between the primary authentication coil A1 and the secondary authentication coil A2, the second voltage signal Vx2 is changed to the waveform illustrated in FIG. 17B. When a metal piece M is present between the primary authentication coil A1 and the secondary authentication coil A2, the second voltage signal Vx2 is changed to the waveform illustrated in FIG. 17C.

Figure 17C:
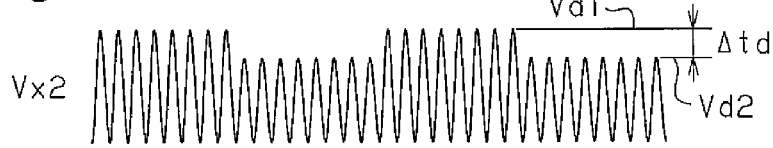
FIG. 17C is a waveform diagram of a voltage that the second envelope detection circuit acquires from the primary authentication coil when a metal piece is present.

The second voltage signals Vx2 of FIGS. 17B and 17C each have a period (high level period), during which a relatively large amplitude continues in correspondence with the waveform of the authentication load modulation signal Φm2 from the secondary authentication coil A2, and a period (low level period) during which a relatively small amplitude continues.

For example, the second voltage signal Vx2 of FIG. 17B has a difference Δtc between the amplitude value Vc1 in the high level period and the amplitude value Vc2 in the low level period. The second voltage signal Vx2 of FIG. 17C has a difference Δtd between the amplitude value Vd1 in the high level period and the amplitude value Vd2 in the low level period. The difference Δtc is greater than the difference Δtd. Thus, the difference between the respective amplitudes in the high and low level periods of the second voltage signal Vx2 is smaller when the metal piece M is present between the primary authentication coil A1 and the secondary authentication coil A2 than when the metal piece M is not present (Δtd<Δtc).

This is because the presence of the metal piece M between the primary authentication coil A1 and the secondary authentication coil A2 weakens the magnetic coupling of the primary authentication coil A1 and the secondary authentication coil A2. Thus, the primary authentication coil A1 is less affected by the impedance of the electric appliance E, and the amplitude in the low level period, during which the primary authentication coil A1 is greatly affected by the impedance of the electric appliance E, is changed by a greater amount than the amplitude in the high level period, during which the primary authentication coil is not affected much by the impedance of the electric appliance E.

The second envelope detection circuit 64 converts the current flowing to the primary authentication coil A1 into the second voltage signal Vx2, generates the second load modulation signal Ve2 by detecting an envelope of the second voltage signal Vx2, and provides the signal Ve2 to the system controller 52.

The system controller 52 includes an A/D converter circuit that A/D-converts the first load modulation signal Ve1 and the second load modulation signal Ve2 respectively provided from the first envelope detection circuit 63 and the second envelope detection circuit 64.

The system controller 52 determines whether or not the electric appliance E is present on the setting surface 3 of the contactless power supply device and whether or not a metal piece M is present based on the A/D-converted first and second load modulation signals Ve1 and Ve2.

Figure 18:
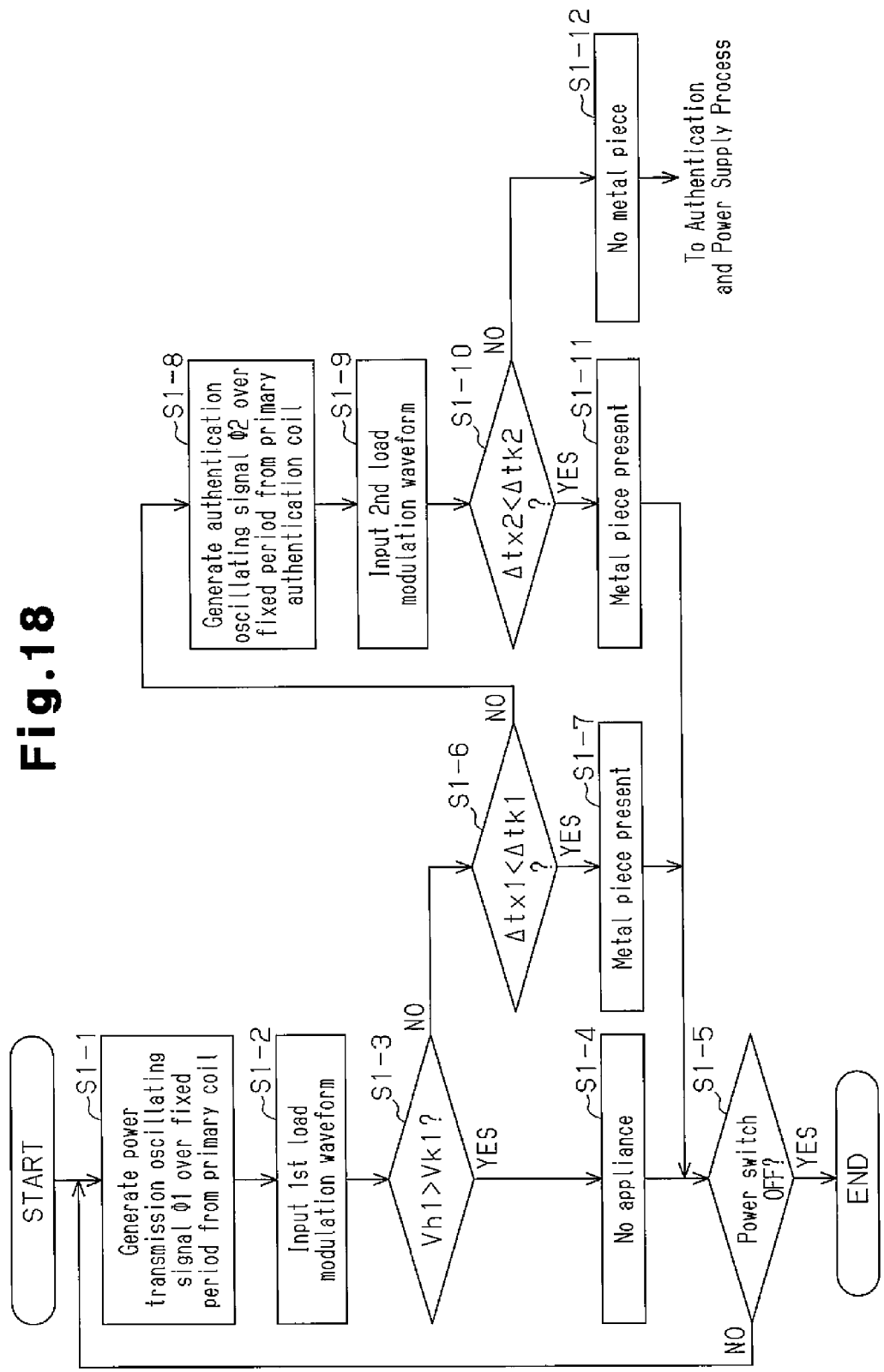
FIG. 18 is a flowchart illustrating operations processed by a system controller.

The operation of the contactless power supply system will now be described. FIG. 18 is a flowchart illustrating operations processed by the system controller 52 in the power supply device 1.

When a power switch (not illustrated) is turned ON, commercial power is supplied to the power circuit 51. Then, the power circuit 51 applies DC voltage, as drive power, to the system controller 52 and the basic power supply unit circuits 6.

The system controller 52 sequentially provides the first excitation control signals CT1 to the primary coil drive control circuits 61 of the basic power supply unit circuits 6. This sequentially excites the primary coils L1 of the power supply areas AR1 to generate power transmission oscillating signals Φ1 over fixed periods (step S1-1).

When the power transmission oscillating signals Φ1 are generated, the system controller 52 sequentially A/D-converts the first load modulation signals Ve1 provided from the corresponding first envelope detection circuit 63 (step S1-2).

The system controller 52 determines whether or not the amplitude value (amplitude in high level period) Vh1 of the A/D-converted first load modulation signals Ve1 is greater than a predetermined reference amplitude Vk1 (step S1-3). For example, the predetermined reference amplitude Vk1 is an amplitude value (high level value) of the first load modulation signal Ve1 corresponding to the power transmission oscillating signal Φ1 when no object is on the primary coil L1 and the core 12, that is, the amplitude of the first voltage signal Vx1 of FIG. 16A. The reference amplitude Vk1 may be determined in advance through experiments or the like. In addition, the reference amplitude Vk1 is stored in a memory incorporated in the system controller 52.

Figure 19A:
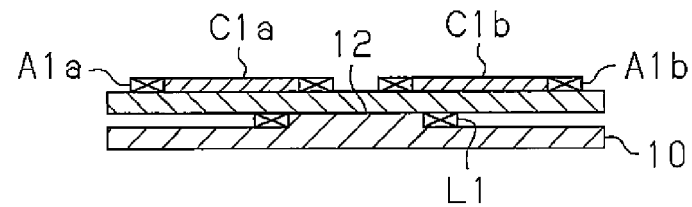
FIG. 19A is view illustrating a state in which no object is set on the power supply device.

When the amplitude value Vhf of the first load modulation signal Ve1 is determined as being greater than the reference amplitude Vk1 (YES in step S1-3), the system controller 52 determines that the electric appliance E is not set above the primary coil L1 and the core 12 as illustrated in FIG. 19A (step S1-4).

Then, the system controller 52 checks whether or not the power switch is turned OFF (step S1-5).

When the power switch is not turned OFF (NO in step S1-5), the process returns to step S1-1, and the system controller 52 waits for the electric appliance E to be set while repeating steps S1-1 to S1-5. In other words, the system controller 52 waits for the electric appliance E, which is to be supplied with power, to be set while sequentially and intermittently exciting the primary coils L1 in the power supply areas AR1 to generate the power transmission oscillating signals Φ1 until the power switch is turned OFF.

Figure 19B:
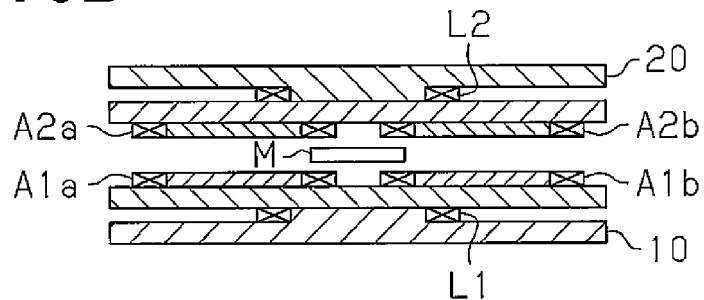
FIG. 19B is a view illustrating a state in which a metal piece is present between a core of the primary coil and a core of the secondary coil.
Figure 19C:
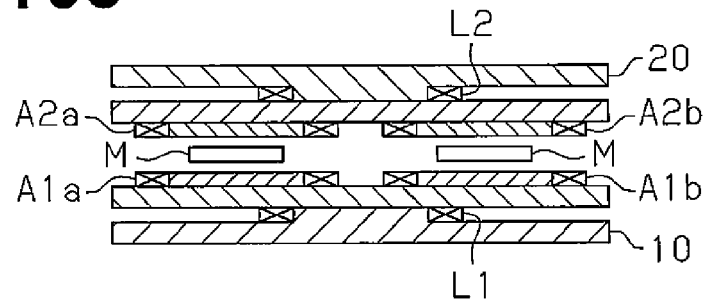
FIG. 19C is a view illustrating a state in which a metal piece is present between the primary and secondary authentication coils.
Figure 19D:
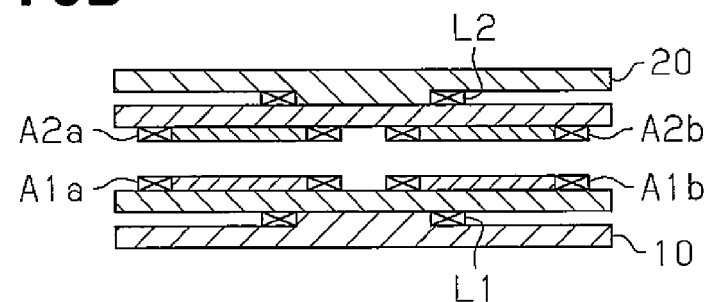
FIG. 19D is a view illustrating a state in which a metal piece is not present between the power supply device and the electric appliance.

When at least one of the amplitude values Vhf is determined to be less than or equal to the reference amplitude Vk1 (NO in step S1-3), the system controller 52 determines that an object (the electric appliance E and/or the metal piece M) is present above the corresponding primary coil L1 and the core 12, as illustrated in FIGS. 19B, 19C and 19D, and proceeds to step 1-6.

In step 1-6, the system controller 52 determines the amplitude difference Δtx1 between the amplitudes of the first load modulation signal Ve1 in the high and low level periods. Then, the system controller 52 determines whether or not the amplitude difference Δtx1 is less than the predetermined reference difference Δtk1.

For example, the reference difference Δtk1 is an amplitude difference of the first load modulation signal Ve1 when a metal piece M is present between the primary coil L1 and core 12 and the secondary coil L2 and core 22, that is, the amplitude difference of the first load modulation signal Ve1 that corresponds to the amplitude difference Δtb of the first voltage signal Vx1 of FIG. 16C. The reference difference Δtk1 may be determined in advance through experiments or the like. In addition, the reference difference Δtk1 is stored in a memory incorporated in the system controller 52.

When the amplitude difference Δtx1 is less than the reference difference Δtk1, the amplitude difference Δtx1 indicates that a metal piece M is not present above the primary coil L1 and the core 12. When the amplitude difference Δtx1 is greater than or equal to the reference difference $\Delta tk1$, the amplitude difference $\Delta tx1$ indicates that a metal piece M is present above the primary coil L1 and the core 12.

When determining that the amplitude difference $\Delta tx1$ is less than the reference difference $\Delta tk1$ (YES in step S1-6), the system controller 52 determines that a metal piece M is present above the primary coil L1 and the core 12, as illustrated in FIG. 19B (step S1-7). Then, the system controller 52 checks whether the power switch is turned OFF or not (step S1-5).

When the power switch is not turned OFF (NO in step S1-5), the process returns to step S1-1, and the system controller 52 waits for the metal piece M to be removed and the electric appliance E to be set while repeating steps S1-1 to S1-3, S1-6, S1-7 and S1-5. In other words, the system controller 52 waits for the electric appliance E to be set while sequentially and intermittently exciting the primary coils L1 in the power supply areas AR1 to generate the power transmission oscillating signals $\Phi1$ until the power switch is turned OFF.

When a metal piece M is present, the primary coils L1 are sequentially and intermittently excited. The intermittent excitation and driving is determined so that the temperature of the metal piece M subtly increases or does not increase at all.

When determining that the amplitude difference $\Delta tx1$ is greater than or equal to the reference difference $\Delta tk1$ (NO in step S1-6), the system controller 52 determines that a metal piece M is not present between the primary coil L1 and core 12 and the secondary coil L2 and core 22.

Next, the system controller 52 checks whether or not a metal piece M is present between each of the primary authentication coils A1 and the secondary authentication coil A2, as illustrated in FIG. 19C. The system controller 52 sequentially supplies the second excitation control signals CT2 to the primary authentication coil drive oscillation circuits 62 of the basic power supply unit circuits 6. This sequentially excites the primary authentication coils A1 in the power supply areas AR1 to generate the authentication oscillating signals $\Phi2$ over fixed periods (step S1-8).

When the authentication oscillating signals $\Phi2$ are generated, the system controller 52 sequentially A/D-converts the second load modulation signals Ve2 provided from the corresponding second envelope detection circuits 64 (step S1-9).

The system controller 52 obtains a difference $\Delta tx2$ between a high level value and low level value of the A/D-converted second load modulation signal Ve2 and determines whether or not the difference $\Delta tx2$ is less than the predetermined reference difference $\Delta tk2$ (step S1-10). For example, the reference difference $\Delta tk2$ is the difference in the second load modulation signal Ve2 corresponding to the difference $\Delta td$ in the second voltage signal Vx2 of FIG. 17C. The reference difference $\Delta tk2$ is obtained in advance through experiments or the like. In addition, the reference difference $\Delta tk2$ is stored in a memory incorporated in the system controller 52.

When the difference $\Delta tx2$ is less than the reference difference tk2, the difference $\Delta tx2$ indicates that a metal piece M is present above the first primary core C1a and the second primary core C1b of the primary authentication coil A1 (A1a and A1b). When the difference $\Delta tx2$ is greater than or equal to the reference difference $\Delta tk2$, the difference tx2 indicates that a metal piece M is not present above the first primary core C1a and the second primary core C1b of the primary authentication coil A1 (A1a and A1b).

When at least one of the differences $\Delta tx2$ is determined to be less than the reference difference $\Delta tk2$ (YES in step S1-10), the system controller 52 determines that a metal piece M is present above the corresponding first primary core C1a or second primary core C1b, as illustrated in FIG. 19C (step S1-11). Then, the system controller 52 checks whether or not the power switch is turned OFF (step S1-5).

When the power switch is not turned OFF (NO in step S1-5), the system controller 52 returns to step S1-1 and waits for the electric appliance E to be set while repeating steps S1-1 to S1-3, S1-6, S1-8 to S1-11 and S1-5. In other words, the system controller 52 waits for the metal piece M to be removed and the electric appliance E that is to be supplied with power to be set while sequentially and intermittently exciting the primary coils L1 and the primary authentication coils A1 in the power supply areas AR1 until the power switch is turned OFF.

When a metal piece M is present, the primary authentication coil A1 is sequentially and intermittently excited. The intermittent excitation and driving may be determined so that the temperature of the metal piece M subtly increases or does not increase at all.

When determining that the difference $\Delta tx2$ is greater than or equal to the reference difference $\Delta tk2$ in step 1-10 (NO in step S1-10), the system controller 52 determines that a metal piece M is not present between the primary authentication coils A1 (A1a and A1b) and the secondary authentication coil A2 (A2a and A2b), as illustrated in FIG. 19D (step S1-12).

In this manner, when determining that a metal piece M is also not present between the primary coil L1 and core 12 and the secondary coil L2 and core 22 and between the primary authentication coils A1 (A1a and A1b) and the secondary authentication coil A2 (A2a and A2b), the system controller 52 performs an appliance authentication process.

Specifically, during the appliance authentication process, the system controller 52 sequentially generates the authentication oscillating signals $\Phi2$ with the primary authentication coils A1. The system controller 52 determines whether or not the electric appliance E is allowed to be supplied with power from the waveform of the second load modulation signal Ve2 acquired from the corresponding second envelope detection circuit 64.

After the authentication is accomplished, the system controller 52 excites the primary coil L1 in the power supply area AR1 on which the electric appliance E, which is allowed to be supplied with power, is set and thereby supplies power to the electric appliance E.

The advantages of the first embodiment will now be described.

(1) According to the first embodiment, in the power supply device 1, the primary coil L1 and the primary authentication coil A1 (A1a and A1b) are arranged in each power supply area AR1 at different locations. In the electric appliance E, the secondary coil L2 and the secondary authentication coil A2 (A2a and A2b) are arranged in the power reception area AR2 at different locations. Further, a metal piece M is detected for between the primary coil L1 and secondary coil L2 and between the primary authentication coil A1 and secondary authentication coil A2. This increase the area over which a metal foreign object can be detected in each power supply area AR1 and improves the accuracy for detecting a small metal foreign object in the power supply area AR1.

(2) According to the first embodiment, the first primary authentication coil A1a and the second primary authentication coil A1b that function as the primary authentication coil A1 are arranged at symmetric locations with the primary coil L1, which is located in the middle of the power supply area AR1, arranged in between. Further, the first secondary authentication coil A2a and the second secondary authentication coil A2b that function as the secondary authentication coil A2 are arranged at symmetrical locations with the secondary coil L2, which is located in the middle of the power reception area AR2, arranged in between. The increased number of the primary authentication coils A1 increases the area of each power supply area AR1 over which a metal foreign object can be detected and improves the accuracy for detecting a small metal foreign object in each power supply area AR1.

Moreover, the first primary authentication coil A1a and the second primary authentication coil A1b, which are arranged at symmetrical locations with the primary coil L1 arranged in between, generate magnetic fluxes in opposite directions. In the same manner, the first secondary authentication coil A2a and the second secondary authentication coil A2b, which are arranged at symmetrical locations with the secondary coil L2 arranged in between, generate magnetic fluxes in opposite directions. Accordingly, when the primary authentication coil A1 is excited, the magnetic circuit Φb illustrated in FIG. 9C is formed. This allows for detection of a metal foreign object in a range that cannot be detected with just the primary coil L1 and the secondary coil L2. When the primary coil L1 is excited, the magnetic circuit Φa illustrated in FIG. 9B is formed. This allows for detection of a metal foreign object in a range that cannot be detected with just the primary authentication coil A1 and the secondary authentication coil A2.

(3) According to the first embodiment, as for the metal detection, first, the primary coil drive control circuits 61 caused the corresponding primary coils L1 to generate the power transmission oscillating signals Φ1; then it was determined whether or not a metal piece M is present above each primary coil L1. When a metal piece M was determined to be present above at least one of the primary coils L1 (YES in step S1-6), the system controller 52 entered a standby state, without driving the primary authentication coil drive oscillation circuits 62 and causing the primary authentication coils A1 to generate the authentication oscillating signals Φ2.

Consequently, the system controller 52 can return to the standby state more promptly, so that the load of the system controller 52 is decreased.

(4) According to the first embodiment, the primary coil L1 is wound around the core 12 formed on the magnetic body 10, which has a larger area than the coil area of the primary authentication coil A1. Further, the secondary coil L2 is wound around the core 22 formed on the magnetic body 20, which has a larger area than the coil area of the secondary authentication coil A2. Further, the primary authentication coil A1 wound around the first primary core C1a and second primary core C1b, which are made of resin, is fixed to the resin substrate SB1. The secondary authentication coil A2 wound the first secondary core C2a and second secondary core C2b, which are made of resin, is fixed to the resin substrate SB2. Accordingly, the magnetic coupling formed between the primary authentication coil A1 and the secondary authentication coil A2 is strengthened by the magnetic bodies 10 and 20. That is, when changing the first primary core C1a, second primary core C1b, first secondary core C2a, second secondary core C2b, and resin substrates SB1 and SB2 into magnetic bodies, the magnetic coupling between the primary coil L1 and the secondary coil L2 generates eddy current that flows to and heats the changed magnetic bodies. As a result, the magnetic coupling between the primary authentication coil A1 and the secondary authentication coil A2 is weakened.

In the first embodiment, the first primary authentication coil A1a (each second primary authentication coil A1b) has the same coil area as the primary coil L1. However, the primary coil L1 may have a larger coil area.

In the first embodiment, the power transmission oscillating signal Φ1 has a lower frequency than the authentication oscillating signal Φ2.

The resonance circuit characteristics of the primary coil L1 and the secondary coil L2 maximize the Q factor. Thus, to optimize the inductances, the frequency of the power transmission oscillating signal Φ1 is decreased and the number of coil windings is increased. This increases the coil area. Since the coil area increases, more magnetic fluxes intersect one another, and a metal piece M can be detected over a wider area.

Consequently, metal detection can first be performed over a wide range of the power supply area AR1 with the power transmission oscillating signal Φ1 having a low frequency. Then, metal detection can be performed over a narrow range of the power supply area AR1 with the power transmission oscillating signal Φ2 having a high frequency. In other words, metal detection is first performed over a wide part of the power supply area AR1 and then performed over a narrow part of the power supply area AR1.

Accordingly, when the system controller 52 first detects for a metal piece M over a wide range of the power supply area AR1 with the power transmission oscillating signal Φ1 having a low frequency and a metal piece M is detected in the present state, the system controller 52 does not perform metal detection with the authentication oscillating signal Φ2 and thus skips a metal detection process flow. This shortens the time required for metal detection.

A second embodiment of the present invention will now be described in detail with reference to FIGS. 20 and 21 centering on parts differing from the first embodiment.

The second embodiment differs from the first embodiment in the structures of the primary coil L1, secondary coil L2, primary authentication coil A1, and secondary authentication coil A2.

Figure 20:
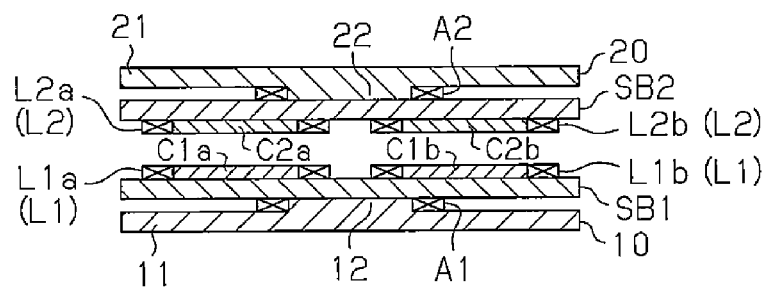
FIG. 20 is a cross-sectional view illustrating a state in which a primary coil and a primary authentication coil of a power supply device are opposed to a secondary coil and a secondary authentication coil of an electric appliance in a second embodiment of the present invention.

As illustrated in FIG. 20, in the second embodiment, the primary coil L1, which is arranged in the power supply area AR1, is arranged above the primary authentication coil A1. The secondary coil L2, which is arranged in the power reception area AR2, is arranged below the secondary authentication coil A2.

In FIG. 20, the primary authentication coil A1 is wound around a magnetic body 10, which is made of ferrite like the one wound around which the primary coil L1 of the first embodiment is wound. The magnetic body 10 is formed to have a tetragonal plate shape in conformance with the contour of the power supply area AR1. The magnetic body 10 includes a core 12 and a rim 11, which surrounds the core 12. The core 12 is a projection extending upward. The core 12 is rectangular (may be square) in shape as viewed from above.

The primary authentication coil A1 is wound around the core 12 of the magnetic body 10. The primary authentication coil A1 and magnetic body 10 are arranged in the casing 2 at locations corresponding to each power supply area AR1.

The upper side of each magnetic body 10 is fixed to a resin substrate SB1 made of a non-magnetic resin. The primary coil L1 is fixed by an adhesive to the resin substrate SB1. The primary coil L1, which is fixed to the resin substrate SB1, includes a first primary coil L1a and a second primary coil L1b.

The first primary coil L1a and the second primary coil L1b are respectively wound around the first primary core C1a and the second primary core C1b, which are made of a non-magnetic resin. The first primary coil L1a and the second primary coil L1b are fixed by an adhesive to the resin substrate SB1. The first primary coil L1a and the second primary coil L1b are not overlapped with each other as viewed from above and are preferably separated in the horizontal direction located in the left half region and right half region of each power supply area AR.

Accordingly, when the resin substrate SB1 is fixed to the upper side of the magnetic body 10, the primary authentication coil A1 is arranged in the middle portion of the power supply area AR1. The first primary coil L1a and the second primary coil L1b are arranged at symmetrical locations with the middle of the power supply area AR1 arranged in between.

The first primary coil L1a and the second primary coil L1b are connected in series and wound to generate magnetic fluxes in opposite directions.

The secondary authentication coil A2 is wound around a magnetic body 20, which is made of ferrite like the one wound around the secondary coil L2 of the first embodiment. In the second embodiment, the magnetic body 20 is formed to have a tetragonal plate shape in conformance with the contour of the power reception area AR2. The magnetic body 20 includes a core 22 and a rim 21 surrounding the core 22. The core 22 is a projection extending downward. The core 22 is rectangular (may be square) in shape as viewed from below. The magnetic body 20 in which the secondary authentication coil A2 is wound around the secondary core 22 is arranged in the casing 5 of the electric appliance E.

In the casing 5 of the electric appliance E, a resin substrate SB2, which is made of a non-magnetic resin, is fixed to the lower side of the magnetic body 20. The secondary coil L2 is fixed by an adhesive to the resin substrate SB2. The secondary coil L2 fixed to the resin substrate SB2 includes a first secondary coil L2a and a second secondary coil L2b.

The first secondary coil L2a and the second secondary coil L2b are wound around a first secondary core C2a and a second secondary core C2b, respectively. The first secondary core C2a and the second secondary core C2b are made of a non-magnetic resin and fixed by an adhesive to the resin substrate SB2. The first secondary coil L2a and the second secondary coil L2b do not overlap each other, as viewed from below, and are preferably separated in the horizontal direction so as to be arranged in the left half region and right half region of the power reception area AR2, respectively.

Accordingly, when the resin substrate SB2 is fixed to the lower side of the magnetic body 20, the secondary authentication coil A2 is arranged in the middle portion of the power reception area AR2. The first secondary coil L2a and the second secondary coil L2b are arranged at symmetrical locations with the middle portion of the power reception area AR2 arranged in between.

The first secondary coil L2a and the second secondary coil L2b are connected in series and wound to generate magnetic fluxes in opposite directions.

The secondary authentication coil A2 has the same shape as the primary authentication coil A1. In addition, the first secondary coil L2a is formed to have the same shape as the first primary coil L1a in each power supply area AR1 of the power supply device 1, and the second secondary coil L2b is formed to have the same shape as the second primary coil L1b in each power supply area AR1.

As illustrated in FIG. 20, when the power reception area AR2 of the electric appliance E opposes the power supply area AR1 of the power supply device 1, the core 12 of the primary authentication coil A1 is aligned with the core 22 of the secondary authentication coil A2. In addition, the first primary core C1a of the first primary coil L1a is aligned with the first secondary core C2a of the first secondary coil L2a. Further, the second primary core C1b of the second primary coil L1b is aligned with the second secondary core C2b of the second secondary coil L2b.

Figure 21A:
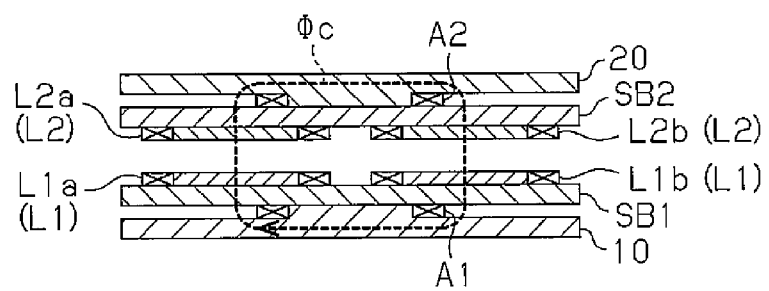
FIG. 21A is a view illustrating a magnetic circuit when the primary coil is excited.
Figure 21B:
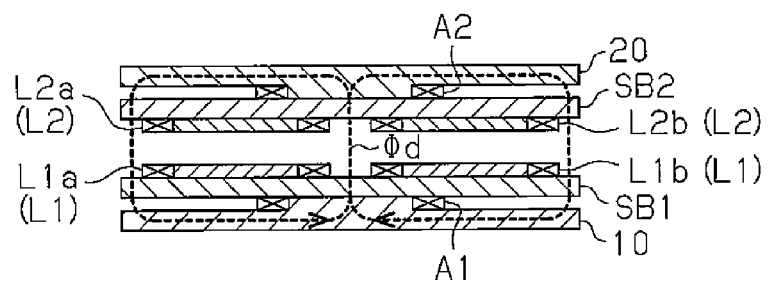
FIG. 21B is a view illustrating a magnetic circuit when the primary authentication coil is excited.

When the primary coil L1 is excited with the power reception area AR2 and the power supply area AR1 opposing each other, a magnetic circuit Φc is formed, as illustrated in FIG. 21A. When the primary authentication coil A1 is excited with the power reception area AR2 and the power supply area AR1 opposing each other, a magnetic circuit Φd is formed, as illustrated in FIG. 21B.

The primary coil L1 and primary authentication coil A1 are electrically connected to the basic power supply unit circuit 6 corresponding to each power supply area AR1. For example, the primary coil L1 is connected to the primary coil drive control circuit 61 and first envelope detection circuit 63. The primary authentication coil A1 is connected to the corresponding primary authentication coil drive oscillation circuit 62 and second envelope detection circuit 64.

The secondary coil L2 is connected to the power reception circuit 30, and the secondary authentication coil A2 is connected to the authentication circuit 40. For example, the secondary coil L2 is connected to the first rectifying circuit 31 and the first load modulation circuit 34. The secondary authentication coil A2 is connected to the second rectifying circuit 41 and the second load modulation circuit 43.

In the second embodiment, the system controller 52 controls the basic power supply unit circuits 6 in the same manner as the first embodiment. Thus, advantageous (1) to (3) of the first embodiment are obtained.

Further, according to the second embodiment, the primary authentication coil A1 is wound around the core 12 formed on the magnetic body 10 having a wider area than the coil area of the primary coil L1. Also, the secondary authentication coil A2 is wound around the core 22 formed on the magnetic body 20 having a wider area than the coil area of the secondary coil L2.

The first primary coil L1a and the second primary coil L1b respectively wound around the first primary core C1a and the second primary core C1b, which are made of resin, are fixed to the resin substrate SB1. Further, the first secondary coil L2a and the second secondary coil L2b, which are wound around the first secondary core C2a and the second secondary core C2b that are made of resin, are fixed to the resin substrate SB2.

Accordingly, the magnetic coupling of the primary coil L1 and the secondary coil L2 can be strengthened by the magnetic bodies 10 and 20. For example, when the first primary core C1a, second primary core C1b, first secondary core C2a, second secondary core C2b, and resin substrates SB1 and SB2 are changed to magnetic bodies, the magnetic coupling between the primary coil L1 and the secondary coil L2 generates eddy current and heats the changed magnetic bodies. As a result, the magnetic coupling of the primary coil L1 and the secondary coil L2 are weakened.

Figure 22:
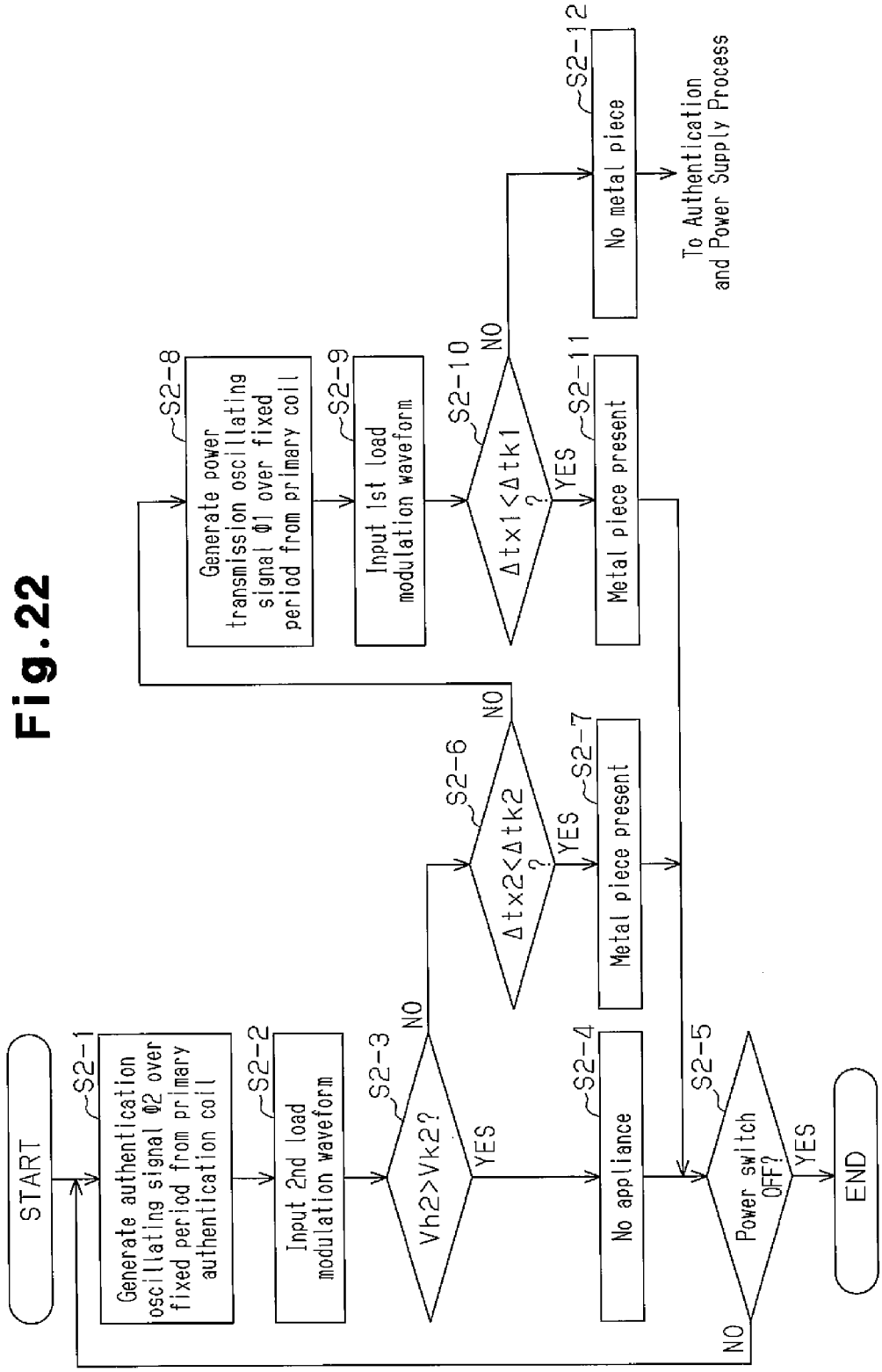
FIG. 22 is a flowchart illustrating operations processed by a system controller in a third embodiment.

A third embodiment of the present invention will be described with reference to FIG. 22.

The third embodiment differs from the first embodiment in that the primary authentication coils A1 generate the authentication oscillating signals Φ2 to detect a metal piece M and then the primary coil L1 generates the power transmission oscillating signals Φ1 to detect a metal piece M. In addition, the frequency of the authentication oscillating signals Φ2 is lower than the frequency of the power transmission oscillating signals Φ1.

Accordingly, the operations processed by the system controller 52 differ from the first embodiment. Accordingly, for the sake of brevity, the operations processed by the system controller 52 arranged in the power supply device 1 will now be described with reference to the flowchart of FIG. 22.

When supplied with drive power, the system controller 52 sequentially provides the second excitation control signals CT2 to the primary authentication coil drive oscillation circuits 62 of the basic power supply unit circuits 6. This excites each primary authentication coil A1 for a fixed period to generate the authentication oscillating signal $\Phi 2$ (step S2-1). The primary authentication coils A1 of the power supply areas AR1 sequentially generate the authentication oscillating signals $\Phi 2$ for fixed periods.

With the oscillation of the authentication oscillating signal $\Phi 2$ of each primary authentication coil A1, the system controller 52 sequentially A/D-converts and acquires the second load modulation signals Ve2 from the second envelope detection circuits 64 (step S2-2).

The system controller 52 determines whether or not the amplitude values (high level period) Vh2 of the acquired, A/D-converted second load modulation signals Ve2 is greater than a predetermined reference amplitude Vk2 (step S2-3). Here, the predetermined reference amplitude Vk2 is an amplitude value (high level value) of the second load modulation signal Ve2 corresponding to the amplitude value (high level value) of the second voltage signal Vx2 illustrated in FIG. 17 based on the authentication oscillating signal $\Phi 2$ when no object is set above the primary authentication coil A1. This reference amplitude Vk2 is obtained in advance through experiments or the like. In addition, the reference amplitude Vk2 is stored in a memory incorporated in the system controller 52.

When determining that the amplitude value Vh2 of the second load modulation signal Ve2 is greater than the reference amplitude Vk2 (YES in step S2-3), the system controller 52 determines that the electric appliance E is not set above the primary authentication coils A1 (step S2-4).

When determining that the electric appliance E that is to be supplied with power is not set above the primary authentication coils A1 (step S2-4), the system controller 52 checks whether the power switch is turned OFF or not (step S2-5).

If the power switch is not turned OFF (NO in step S2-5), the process returns to step S2-1, and the system controller 52 waits for the electric appliance E to be set while repeating steps S2-1 to S2-5.

When determining that the amplitude values Vh2 is less than or equal to the reference amplitude Vk2 (NO in step S2-3), the system controller 52 determines that an object (electric appliance E) is present above the primary authentication coil A1 and proceeds to step 2-6.

In step 2-6, the system controller 52 obtains a difference $\Delta tx2$ between the high and low level values of the second load modulation signal Ve2. Then, the system controller 52 determines whether or not the difference $\Delta tx2$ is less than a predetermined reference difference $\Delta tk2$.

When determining that the difference $\Delta tx2$ is less than the reference difference $\Delta tk2$ (YES in step S2-6), the system controller 52 determines that a metal piece M is present above the primary authentication coil A1 (step S2-7). When determining that a metal piece M is present above one of the primary authentication coils A1 (step S2-7), the system controller 52 checks whether or not the power switch is turned OFF (step S2-5).

When the power switch is not turned OFF (NO in step S2-5), the system controller 42 returns to step S2-1, repeats steps S2-1 to S2-3, S2-6, S2-7 and S2-5 and waits for the removal of the metal piece M and the setting of the electric appliance E.

When determining that the difference $\Delta tx2$ is greater than or equal to the reference difference $\Delta tk2$ in step 2-6 (NO in step S2-6), the system controller 52 determines that a metal piece M is not present between the primary authentications coil A1 and the secondary authentication coil A2. The system controller 52 then proceeds to step S2-8 and detects whether or not a metal piece M is present between the primary coil L1 and the secondary coil L2.

The system controller 52 sequentially provides the first excitation control signals CT1 to the primary coil drive control circuits 61 of the basic power supply unit circuits 6 thereby exciting each primary coil L1 over a fixed period and oscillating the power transmission oscillating signal $\Phi 1$ (step S2-8). Accordingly, the primary coils L1 in the power supply areas AR1 sequentially generate the power transmission oscillating signals $\Phi 1$ over fixed periods.

Due to the oscillation of the power transmission oscillating signals $\Phi 1$ of the primary coils L1 over the fixed periods, the system controller 52 A/D-converts and sequentially acquires the first load modulation signals Ve1 from the first envelope detection circuits 63 (step S2-9).

Then, the system controller 52 obtains an amplitude difference $\Delta tx1$ between the high and low level values of the acquired first load modulation signal Ve1 and determines whether or not the amplitude difference $\Delta tx1$ is less than a predetermined reference difference $\Delta tk1$ (step S2-10).

When determining that the amplitude difference $\Delta tx1$ is less than the reference difference $\Delta tk1$ (YES in step S2-10), the system controller 52 determines that a metal piece M is present above the primary coil L1 (step S2-11). When determining that a metal piece M is present above the primary coil (step S2-11), the system controller 52 checks whether or not the power switch is turned OFF (step S2-5).

When the power switch is not turned OFF (NO in step S2-5), the system controller 52 returns to step S2-1, repeats steps S2-1 to S2-3, S2-6, S2-8 to S2-11 and S2-5, and waits for the electric appliance E to be set. In other words, the system controller 52 sequentially and intermittently excites the primary coils L1 and the primary authentication coils A1 in the power supply areas AR1 until the power switch is turned OFF and waits for the removal of the metal piece M and the setting of the electric appliance E.

In step S2-10, when determining that the amplitude difference $\Delta tx1$ is greater than or equal to the predetermined reference difference $\Delta tk1$ (NO in step S2-10), the system controller 52 determines that a metal piece M is not present between the primary coils L1 and the secondary coil L2 (step S2-12).

When determining that a metal piece M is not present in the power supply areas AR1, the system controller 52 performs an appliance authentication process and then a power supply process.

Accordingly, in the third embodiment, the system controller 52 controls the basic power supply unit circuits 6 in the same manner as the first embodiment. This obtains advantages (1) to (4) of the first embodiment.

In the third embodiment, the system controller 52 operates each primary coil L1, secondary coil L2, primary authentication coil A1, and secondary authentication coil A2 in accordance with the configuration of the first embodiment. This may be applied to each primary coil L1 and secondary coil L2 of the power supply device 1 and each primary authentication coil A1 and secondary authentication coil A2 of the electric appliance E described in the second embodiment.

The first to third embodiments may be modified as described below.

Figure 23:
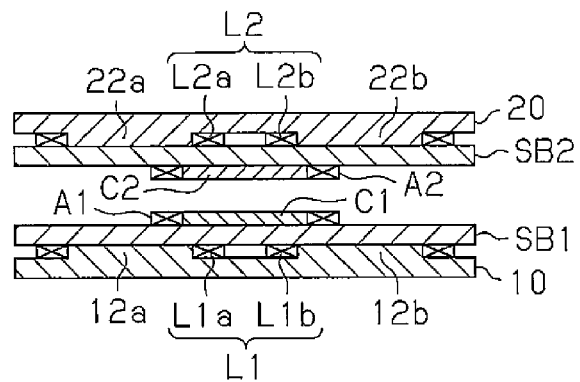
FIG. 23 is a cross-sectional view illustrating a state in which a primary coil and a primary authentication coil in a power supply device are opposed to a secondary coil and a secondary authentication coil in an electric appliance of a modification.

In the first embodiment, a single primary coil L1 is wound around the corresponding magnetic body 10 in the power supply device 1, and a single secondary coil L2 is wound around the magnetic body 20 in the electric appliance E. In an example illustrated in FIG. 23, a primary coil L1 that includes a first primary coil L1a and a second primary coil L1b is wound around a magnetic body 10, and a secondary coil L2 that includes a first secondary coil L2a and a second secondary coil L2b are wound around a magnetic body 20.

The magnetic body 10 includes two cores 12a and 12b, each of which is flat and tetragonal in shape, and a rim 11, which surrounds the cores 12a and 12b. The cores 12a and 12b are projections extending upward. The first primary coil L1a is wound around the first core 12a and the second primary coil L1b is wound around the second core 12b. The first primary coil L1a and the second primary coil L1b do not overlap each other as viewed from above and are arranged at symmetrical locations with the middle of the power supply area AR1 arranged in between.

The first primary coil L1a and the second primary coil L1b are connected in series to each other and are wound to generate magnetic fluxes in opposite directions.

The magnetic body 20 includes cores 22a and 22b. The cores 22a and 22b are projections extending downward, and are, for example, tetragonal in shape. The first secondary coil L2a and the second secondary coil L2b are wound around the first core 22a and the second core 22b, respectively. The first secondary coil L2a and the second secondary coil L2b do not overlap each other as viewed from below and are arranged at symmetrical locations with the middle of the power reception area AR2 arranged in between.

The first secondary coil L2a and the second secondary coil L2b are connected in series and wound to generate magnetic fluxes in opposite directions.

In this case, a single primary authentication coil A1 is necessary, and the single primary authentication coil A1 is arranged at an intermediate position between the first primary coil L1a and the second primary coil L1b as viewed from above. Specifically, a resin substrate SB1 is fixed to the upper side of the magnetic body 10. The primary authentication coil A1 is fixed by an adhesive to the resin substrate SB1. The primary authentication coil A1 is wound around a core C1 made of a non-magnetic resin.

Further, in the electric appliance E, a single secondary authentication coil A2 is necessary, and the single secondary authentication coil A2 is arranged at an intermediate position between the first secondary coil L2a and the second secondary coil L2b as viewed from below. Specifically, a resin substrate SB2 is fixed to the lower side of the magnetic body 20. The secondary authentication coil A2 is fixed by an adhesive to the resin substrate SB2. The secondary authentication coil A2 is wound around a core C2 made of a non-magnetic resin.

Figure 24A:
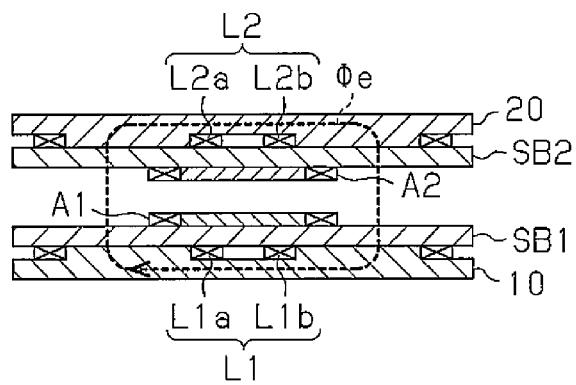
FIG. 24A is a cross-sectional view illustrating a magnetic circuit when the primary coil is excited in a modification.
Figure 24B:
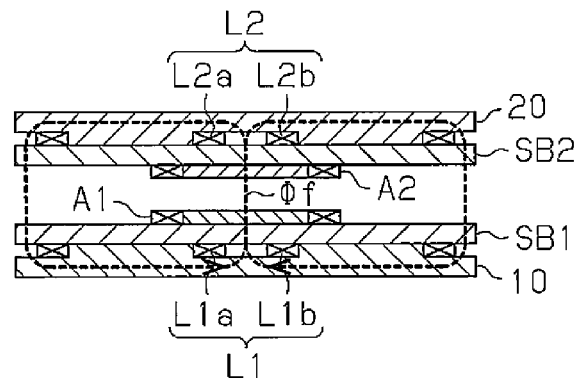
FIG. 24B is a cross-sectional view illustrating a magnetic circuit when the primary authentication coil is excited in a modification.

When the primary coil L1 (L1a and L1b) is excited in a state in which the power reception area AR2 and the power supply area AR1 are opposed to each other, a magnetic circuit Φe is formed, as illustrated in FIG. 24A. Further, when the primary authentication coil A1 is excited in a state in which the power reception area AR2 and the power supply area AR1 are opposed to each other, a magnetic circuit Φf is formed, as illustrated in FIG. 24B. This structure obtains the same advantages as the first embodiment.

In each of the above embodiments, twelve power supply areas AR1 are formed in the setting surface 3 of the power supply device 1. However, there is no limitation to the number of the power supply areas AR1. For example, the power supply device 1 may include one or more power supply areas AR1.

The first multi-vibrator 33 is also referred to as a first modulation wave signal generation circuit. The first load modulation circuit 34 is also referred to as a first load modulation signal generation circuit. The second multi-vibrator 42 is also referred to as a second modulation wave signal generation circuit. The second load modulation circuit 43 is also referred to as a second load modulation signal generation circuit. The primary coil drive control circuit 61 is also referred to as an excitation circuit. The primary authentication coil drive oscillation circuit 62 is also referred to as an oscillation circuit.

The embodiments of the present invention have been described with reference to the accompanying drawings. However, the present invention is not restricted to the foregoing description and may be modified within the scope and equivalence of the appended claims.

The invention claimed is:

1. A method for detecting a metal foreign object in a contactless power supply system including a contactless power supply device and a power reception device, wherein the contactless power supply device includes at least one power supply area and a primary coil and a primary authentication coil, which correspond to the power supply area, and wherein the power reception device is arranged in an electric appliance, which includes at least one power reception area, and includes a secondary coil and a secondary authentication coil, which correspond to the power reception area, the method comprising:
   transmitting an authentication oscillating signal from the primary authentication coil;
   generating an authentication signal with the secondary authentication coil in response to the authentication oscillating signal;
   after the authentication signal is received by the primary authentication coil and authenticated, generating secondary power at the secondary coil with a power transmission oscillating signal generated by the primary coil;
   detecting whether or not a metal foreign object is present between the primary coil and the secondary coil based on the power transmission oscillating signal from the primary coil; and
   detecting whether or not a metal foreign object is present between the primary authentication coil and the secondary authentication coil based on the authentication oscillating signal from the primary authentication coil, wherein
   the primary authentication coil includes a first primary authentication coil and a second primary authentication coil that are connected in series to generate magnetic fluxes in opposite directions,
   the primary coil is wound around a core projecting from a first magnetic body, the first magnetic body having a shape in conformance with the contour of the power supply area,
   the primary coil is arranged in the middle of the power supply area while the first primary authentication coil and the second primary authentication coil are arranged in the power supply area at symmetrical locations with the primary coil arranged in between, the primary coil partially overlapping each of the first primary authentication coil and the second primary authentication coil in a plan view, and the first and second primary authentication coils each including a portion that does not overlap the primary coil in a plan view, and
   the secondary coil is wound around a core projecting from a second magnetic body, the second magnetic body having a shape in conformance with the contour of the power reception area, the secondary authentication coil includes a first secondary authentication coil and a second secondary authentication coil that are connected in series to generate magnetic fluxes in opposite directions, and the secondary coil is arranged in the middle of the power reception area while the first secondary authentication coil and the second secondary authentication coil are arranged in the power reception area at symmetrical locations with the secondary coil arranged in between, the secondary coil partially overlapping each of the first secondary authentication coil and the second secondary authentication coil in a plan view, and the first and second secondary authentication coils each including a portion that does not overlap the secondary coil in a plan view.

2. The method for detecting a metal foreign object according to claim 1, wherein the detection of a metal foreign object between the primary coil and the secondary coil is performed before the detection of a metal foreign object between the primary authentication coil and the secondary authentication coil, and when a metal foreign object is detected to be present between the primary coil and the secondary coil, the detection of a metal foreign object between the primary authentication coil and the secondary authentication coil is not performed.

3. The method for detecting a metal foreign object according to claim 2, wherein the power transmission oscillating signal generated by the primary coil has a lower oscillation frequency than that of the authentication oscillating signal generated by the primary authentication coil.

4. The method for detecting a metal foreign object according to claim 1, wherein the detection of a metal foreign object between the primary authentication coil and the secondary authentication coil is performed before the detection of a metal foreign object between the primary coil and the secondary coil, and when a metal foreign object is detected to be present between the primary authentication coil and the secondary authentication coil, the detection of a metal foreign object between the primary coil and the secondary coil is not performed.

5. The method for detecting a metal foreign object according to claim 4, wherein the authentication oscillating signal generated by the primary authentication coil has a lower oscillation frequency than that of the power transmission oscillating signal generated by the primary coil.

6. A method for detecting a metal foreign object in a contactless power supply system including a contactless power supply device and a power reception device, wherein the contactless power supply device includes at least one power supply area and a primary coil and a primary authentication coil, which correspond to the power supply area, and wherein the power reception device is arranged in an electric appliance, which includes at least one power reception area, and includes a secondary coil and a secondary authentication coil, which correspond to the power reception area, the method comprising:

transmitting an authentication oscillating signal from the primary authentication coil;

generating an authentication signal with the secondary authentication coil in response to the authentication oscillating signal;

after the authentication signal is received by the primary authentication coil and authenticated, generating secondary power at the secondary coil with a power transmission oscillating signal generated by the primary coil;

detecting whether or not a metal foreign object is present between the primary coil and the secondary coil based on the power transmission oscillating signal from the primary coil; and detecting whether or not a metal foreign object is present between the primary authentication coil and the secondary authentication coil based on the authentication oscillating signal from the primary authentication coil, wherein the primary coil includes a first primary coil and a second primary coil that are connected in series to generate magnetic fluxes in opposite directions, with the first and second primary coils being wound around two cores projecting from a first magnetic body, the first magnetic body having a shape in conformance with the contour of the power supply area, and the primary authentication coil is arranged in the middle of the power supply area while the first primary coil and the second primary coil are arranged in the power supply area at symmetrical locations with the primary authentication coil arranged in between, the primary authentication coil partially overlapping each of the first primary coil and the second primary coil in a plan view, and the first and second primary coils each including a portion that does not overlap the primary authentication coil in a plan view, the secondary coil includes a first secondary coil and a second secondary coil that are connected in series to generate magnetic fluxes in opposite directions, with the first and second secondary coils being wound around two cores projecting from a second magnetic body, the second magnetic body having a shape in conformance with the contour of the power reception area, and the secondary authentication coil is arranged in the middle of the power reception area while the first secondary coil and the second secondary coil are arranged in the power reception area at symmetrical locations with the secondary authentication coil arranged in between, the secondary authentication coil partially overlapping each of the first secondary coil and the second secondary coil in a plan view, and the first and second secondary coils each including a portion that does not overlap the secondary authentication coil in a plan view.

7. A contactless power supply device for use with a power reception device including a power reception area, a secondary coil, which generates secondary power in response to a power transmission oscillating signal, and a secondary authentication coil that generates an authentication signal in response to an authentication oscillating signal, wherein the secondary authentication coil includes a first secondary authentication coil and a second secondary authentication coil that are connected in series to generate magnetic fluxes in opposite directions, the secondary coil is wound around a core projecting from a second magnetic body, the second magnetic body having a shape in conformance with the contour of the power reception area, the secondary coil is arranged in the middle of the power reception area while the first secondary authentication coil and the second secondary authentication coil are arranged in the power reception area at symmetrical locations with the secondary coil arranged in between, the secondary coil partially overlapping each of the first secondary authentication coil and the second secondary authentication coil in a plan view, and the first and second secondary authentication coils each including a portion that does not overlap the secondary coil in a plan view, the contactless power supply device comprising:
- at least one power supply area;
- a primary coil, which generates the power transmission oscillating signal, and a primary authentication coil, which generates the authentication oscillating signal, wherein the primary coil and the primary authentication coil correspond to the power supply area;
- a first envelope detection circuit that converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil;
- a second envelope detection circuit that converts an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil; and
- a system controller that determines whether or not a metal foreign object is present in the power supply area based on the first load modulation signal, which is provided from the first envelope detection circuit, and the second load modulation signal, which is provided from the second envelope detection circuit,
- wherein the primary authentication coil includes a first primary authentication coil and a second primary authentication coil that are connected in series to generate magnetic fluxes in opposite directions,
- the primary coil is wound around a core projecting from a first magnetic body, the first magnetic body having a shape in conformance with the contour of the power supply area, and
- the primary coil is arranged in the middle of the power supply area while the first primary authentication coil and the second primary authentication coil are arranged in the power supply area at symmetrical locations with the primary coil arranged in between, the primary coil partially overlapping each of the first primary authentication coil and the second primary authentication coil in a plan view, and the first and second primary authentication coils each including a portion that does not overlap the primary coil in a plan view.

8. The contactless power supply device according to claim 7, wherein the at least one power supply area is a plurality of power supply areas, the contactless power supply device further comprises:
- a plurality of excitation circuits corresponding to the plurality of power supply areas, respectively; and
- a plurality of oscillation circuits corresponding to the plurality of power supply areas, respectively,
- each of the excitation circuits excites the primary coil in the corresponding power supply area to transmit the power transmission oscillating signal, and
- each of the oscillation circuits excites the primary authentication coil in the corresponding power supply area to transmit the authentication oscillating signal.

9. A contactless power supply device for use with a power reception device including a power reception area, a secondary coil, which generates secondary power in response to a power transmission oscillating signal, and a secondary authentication coil that generates an authentication signal in response to an authentication oscillating signal, wherein the secondary authentication coil includes a first secondary authentication coil and a second secondary authentication coil that are connected in series to generate magnetic fluxes in opposite directions, the secondary coil is wound around a core projecting from a second magnetic body, the second magnetic body having a shape in conformance with the contour of the power reception area, the secondary coil is arranged in the middle of the power reception area while the first secondary authentication coil and the second secondary authentication coil are arranged in the power reception area at symmetrical locations with the secondary coil arranged in between, the secondary coil partially overlapping each of the first secondary authentication coil and the second secondary authentication coil in a plan view, and the first and second secondary authentication coils each including a portion that does not overlap the secondary coil in a plan view, the contactless power supply device comprising:
- at least one power supply area;
- a primary coil, which generates the power transmission oscillating signal, and a primary authentication coil, which generates the authentication oscillating signal, wherein the primary coil and the primary authentication coil correspond to the power supply area;
- a first envelope detection circuit that converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil;
- a second envelope detection circuit that converts an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil; and
- a system controller that determines whether or not a metal foreign object is present in the power supply area based on the first load modulation signal, which is provided from the first envelope detection circuit, and the second load modulation signal, which is provided from the second envelope detection circuit, wherein
- the primary coil includes a first primary coil and a second primary coil that are connected in series to generate magnetic fluxes in opposite directions,
- the first and second primary coils are wound around two cores projecting from a first magnetic body, the first magnetic body having a shape in conformance with the contour of the power supply area, and
- the primary authentication coil is arranged in the middle of the power supply area while the first primary coil and the second primary coil are arranged at symmetrical locations with the primary authentication coil arranged in between, the primary authentication coil partially overlapping each of the first primary coil and the second primary coil in a plan view, and the first and second primary coils each including a portion that does not overlap the primary authentication coil in a plan view.

10. The contactless power supply device according to claim 7, wherein
the primary coil is arranged at a lower side of the primary authentication coil so that the primary authentication coil is proximal to the power reception device, and
the primary coil is wound around the core projecting upward from the first c having a larger coil area than the primary coil.

11. A power reception device for use with a contactless power supply device including a power supply area, a primary coil, which generates a power transmission oscillating signal, and a primary authentication coil, which generates an authentication oscillating signal and includes a first primary authentication coil and a second primary authentication coil that are connected in series to generate magnetic fluxes in opposite directions, wherein the primary coil is wound around a core projecting from a first magnetic body, the first magnetic body having a shape in conformance with the contour of the power supply area, the primary coil is arranged in the middle of the power supply area while the first primary authentication coil and the second primary authentication coil are arranged in the power supply area at symmetrical locations with the primary coil arranged in between, the primary coil partially overlapping each of the first primary authentication coil and the second primary authentication coil in a plan view, and the first and second primary authentication coils each including a portion that does not overlap the primary coil in a plan view, wherein the power reception device is arranged in an electric appliance including at least one power reception area, the power reception device comprising:
  a secondary coil and a secondary authentication coil that correspond to the power reception area, wherein
    the secondary authentication coil transmits an authentication signal to the primary authentication coil in response to the authentication oscillating signal generated by the primary authentication coil,
    the secondary coil generates secondary power with the power transmission oscillating signal from the primary coil, and the secondary coil and the secondary authentication coil are arranged in the power reception area at different locations;
  a first modulation wave signal generation circuit that generates a first modulation wave signal from the power transmission oscillating signal received by the secondary coil, wherein the first modulation wave signal reflects a variation in a magnetic flux between the primary coil and the secondary coil;
  a first load modulation signal generation circuit that generates a power transmission load modulation signal by modulating the power transmission oscillating signal with the first modulation wave signal;
  a second modulation wave signal generation circuit that generates a second modulation wave signal from the authentication oscillating signal received by the secondary authentication coil, wherein the second modulation wave signal reflects a variation in a magnetic flux between the primary authentication coil and the secondary authentication coil; and
  a second load modulation signal generation circuit generating an authentication load modulation signal by modulating the authentication oscillating signal with the second modulation wave signal, wherein the secondary coil is wound around a core projecting from a second magnetic body, the second magnetic body having a shape in conformance with the contour of the power reception area,
the secondary authentication coil includes a first secondary authentication coil and a second secondary authentication coil that are connected in series to generate magnetic fluxes in opposite directions, and
the secondary coil is arranged in the middle of the power reception area while the first secondary authentication coil and the second secondary authentication coil are arranged in the power reception area at symmetrical locations with the secondary coil arranged in between, the secondary coil partially overlapping each of the first secondary authentication coil and the second secondary authentication coil in a plan view, and the first and second secondary authentication coils each including a portion that does not overlap the secondary coil in a plan view.

12. A power reception device for use with a contactless power supply device including a power supply area, a primary coil, which generates a power transmission oscillating signal, and a primary authentication coil, which generates an authentication oscillating signal and includes a first primary authentication coil and a second primary authentication coil that are connected in series to generate magnetic fluxes in opposite directions, wherein the primary coil is wound around a core projecting from a first magnetic body, the first magnetic body having a shape in conformance with the contour of the power supply area, the primary coil is arranged in the middle of the power supply area while the first primary authentication coil and the second primary authentication coil are arranged in the power supply area at symmetrical locations with the primary coil arranged in between, the primary coil partially overlapping each of the first primary authentication coil and the second primary authentication coil in a plan view, and the first and second primary authentication coils each including a portion that does not overlap the primary coil in a plan view, wherein the power reception device is arranged in an electric appliance including at least one power reception area, the power reception device comprising:
  a secondary coil and a secondary authentication coil that correspond to the power reception area, wherein
    the secondary authentication coil transmits an authentication signal to the primary authentication coil in response to the authentication oscillating signal generated by the primary authentication coil,
    the secondary coil generates secondary power with the power transmission oscillating signal from the primary coil, and the secondary coil and the secondary authentication coil are arranged in the power reception area at different locations;
  a first modulation wave signal generation circuit that generates a first modulation wave signal from the power transmission oscillating signal received by the secondary coil, wherein the first modulation wave signal reflects a variation in a magnetic flux between the primary coil and the secondary coil;
  a first load modulation signal generation circuit that generates a power transmission load modulation signal by modulating the power transmission oscillating signal with the first modulation wave signal;
  a second modulation wave signal generation circuit that generates a second modulation wave signal from the authentication oscillating signal received by the secondary authentication coil, wherein the second modulation wave signal reflects a variation in a magnetic flux between the primary authentication coil and the secondary authentication coil; and a second load modulation signal generation circuit generating an authentication load modulation signal by modulating the authentication oscillating signal with the second modulation wave signal, wherein the secondary coil includes a first secondary coil and a second secondary coil that are arranged in series to generate magnetic fluxes in opposite directions, with the first and second secondary coils being wound around two cores projecting from a second magnetic body, the second magnetic body having a shape in conformance with the contour of the power reception area, and the secondary authentication coil is arranged in the middle of the power reception area while the first secondary coil and the second secondary coil are arranged at symmetrical locations with the secondary authentication coil arranged in between, the secondary authentication coil partially overlapping each of the first secondary coil and the second secondary coil in a plan view, and the first and second secondary coils each including a portion that does not overlap the secondary authentication coil in a plan view.

13. The power reception device according to claim 11, wherein the secondary coil is arranged at an upper side of the secondary authentication coil so that the secondary authentication coil is proximal to the contactless power supply device, and the secondary coil is wound around the core projecting downward from the second magnetic body having a larger coil area than the secondary coil.

14. A contactless power supply system comprising:

an electric appliance including at least one power reception area and a power reception device; and a contactless power supply device, wherein the contactless power supply device includes at least one power supply area, a primary coil, which corresponds to the power supply area and generates a power transmission oscillating signal, and a primary authentication coil, which corresponds to the power supply area and generates an authentication oscillating signal, the power reception device includes a secondary coil, which corresponds to the power reception area and generates secondary power in response to the power transmission oscillating signal, and a secondary authentication coil, which corresponds to the power reception area and generates an authentication signal in response to the authentication oscillating signal, the contactless power supply device includes a first envelope detection circuit that converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil, a second envelope detection circuit converting an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil, and a system controller that determines whether or not a metal foreign object is present in the power supply area based on the first load modulation signal provided from the first envelope detection circuit and the second load modulation signal provided from the second envelope detection circuit, and the power reception device includes a first modulation wave signal generation circuit that generates a first modulation wave signal from the power transmission oscillating signal received by the secondary coil, wherein the first modulation wave signal reflects a variation in a magnetic flux between the primary coil and the secondary coil, a first load modulation signal generation circuit that generates the power transmission load modulation signal by modulating the power transmission oscillating signal with the first modulation wave signal, a second modulation wave signal generation circuit generating a second modulation wave signal from the authentication oscillating signal received by the secondary authentication coil, and a second load modulation signal generation circuit generating the authentication load modulation signal by modulating the authentication oscillating signal with the second modulation wave signal, wherein the primary coil is wound around a core projecting from a first magnetic body, the first magnetic body having a shape in conformance with the contour of the power supply area, the primary authentication coil includes a first primary authentication coil and a second primary authentication coil that are connected in series to generate magnetic fluxes in opposite directions, the primary coil is arranged in the middle of the power supply area while the first primary authentication coil and the second primary authentication coil are arranged in the power supply area at symmetrical locations with the primary coil arranged in between, the primary coil partially overlapping each of the first primary authentication coil and the second primary authentication coil in a plan view, and the first and second primary authentication coils each including a portion that does not overlap the primary coil in a plan view, the secondary coil is wound around a core projecting from a second magnetic body, the second magnetic body having a shape in conformance with the contour of the power reception area, the secondary authentication coil includes a first secondary authentication coil and a second secondary authentication coil that are connected in series to generate magnetic fluxes in opposite directions, and the secondary coil is arranged in the middle of the power reception area while the first secondary authentication coil and the second secondary authentication coil are arranged in the power reception area at symmetrical locations with the secondary coil arranged in between, the secondary coil partially overlapping each of the first secondary authentication coil and the second secondary authentication coil in a plan view, and the first and second secondary authentication coils each including a portion that does not overlap the secondary coil in a plan view.

15. A contactless power supply system comprising:
an electric appliance including at least one power reception area and a power reception device; and
a contactless power supply device, wherein
the contactless power supply device includes at least one power supply area, a primary coil, which corresponds to the power supply area and generates a power transmission oscillating signal, and a primary authentication coil, which corresponds to the power supply area and generates an authentication oscillating signal,
the power reception device includes a secondary coil, which corresponds to the power reception area and generates secondary power in response to the power transmission oscillating signal, and a secondary authentication coil, which corresponds to the power reception area and generates an authentication signal in response to the authentication oscillating signal,
the contactless power supply device includes
a first envelope detection circuit that converts a power transmission load modulation signal into a first load modulation signal by detecting an envelope of the power transmission load modulation signal when the primary coil receives the power transmission load modulation signal reflecting a variation in a magnetic flux between the primary coil and the secondary coil resulting from the power transmission oscillating signal generated by the primary coil,
a second envelope detection circuit converting an authentication load modulation signal into a second load modulation signal by detecting an envelope of the authentication load modulation signal when the primary authentication coil receives the authentication load modulation signal reflecting a variation in a magnetic flux between the primary authentication coil and the secondary authentication coil resulting from the authentication oscillating signal generated by the primary authentication coil, and
a system controller that determines whether or not a metal foreign object is present in the power supply area based on the first load modulation signal provided from the first envelope detection circuit and the second load modulation signal provided from the second envelope detection circuit, and
the power reception device includes
a first modulation wave signal generation circuit that generates a first modulation wave signal from the power transmission oscillating signal received by the secondary coil, wherein the first modulation wave signal reflects a variation in a magnetic flux between the primary coil and the secondary coil,
a first load modulation signal generation circuit that generates the power transmission load modulation signal by modulating the power transmission oscillating signal with the first modulation wave signal,
a second modulation wave signal generation circuit generating a second modulation wave signal from the authentication oscillating signal received by the secondary authentication coil, and
a second load modulation signal generation circuit generating the authentication load modulation signal by modulating the authentication oscillating signal with the second modulation wave signal,
wherein the primary coil includes a first primary coil and a second primary coil that are connected in series to generate magnetic fluxes in opposite directions,
the first and second primary coils are wound around two cores projecting from a first magnetic body, the first magnetic body having a shape in conformance with the contour of the power supply area,
the primary authentication coil is arranged in the middle of the power supply area while the first primary coil and the second primary coil are arranged in the power supply area at symmetrical locations with the primary authentication coil arranged in between, the primary authentication coil partially overlapping each of the first primary coil and the second primary coil in a plan view, and the first and second primary coils each including a portion that does not overlap the primary authentication coil in a plan view,
the secondary coil includes a first secondary coil and a second secondary coil that are connected in series to generate magnetic fluxes in opposite directions,
the first and second secondary coils are wound around two cores projecting from a second magnetic body, the second magnetic body having a shape in conformance with the contour of the power reception area, and
the secondary authentication coil is arranged in the middle of the power reception area while the first secondary coil and the second secondary coil are arranged in the power reception area at symmetrical locations with the secondary authentication coil arranged in between, the secondary authentication coil partially overlapping each of the first secondary coil and the second secondary coil in a plan view, and the first and second secondary coils each including a portion that does not overlap the secondary authentication coil in a plan view.

* * * * *